(12) United States Patent
Shah

(10) Patent No.: US 9,418,355 B2
(45) Date of Patent: Aug. 16, 2016

(54) CROWDSOURCED RESPONSES MANAGEMENT TO CASES

(71) Applicant: Shahid N. Shah, Silver Spring, MD (US)

(72) Inventor: Shahid N. Shah, Silver Spring, MD (US)

(73) Assignee: NETSPECTIVE COMMUNICATIONS LLC, Silver Spring, MD (US)

( * ) Notice: Subject to any disclaimer, the term of this patent is extended or adjusted under 35 U.S.C. 154(b) by 571 days.

(21) Appl. No.: 14/032,368

(22) Filed: Sep. 20, 2013

(65) Prior Publication Data

US 2015/0088884 A1    Mar. 26, 2015

(51) Int. Cl.
*G06Q 10/10* (2012.01)
*G06Q 50/00* (2012.01)

(52) U.S. Cl.
CPC .............. *G06Q 10/10* (2013.01); *G06Q 50/01* (2013.01)

(58) Field of Classification Search
CPC .. G06Q 50/01; G06Q 10/10; G06F 17/30867; G06F 17/30864; G06F 17/30424
USPC ........... 707/E17.014, 706, E17.005, E17.109, 707/758, 769, E17.009, 607, 723, 731, 784, 707/999.003, E17.001, E17.002, E17.017, 707/E17.032, E17.033, E17.059, E17.108, 707/694, 710, 711, 722, 728, 732, 733, 741, 707/748, 754, 756, 780, 781, 782, 783, 786, 707/802, 999.004, 999.005, 999.007, 707/999.1; 705/40, 2, 1.1, 26.1, 35, 36 R, 705/38, 39, 400, 7.13, 7.14, 7.32, 14.1, 705/26.41, 26.7, 30, 318, 319, 347, 7.35, 705/7.36, 7.38, 80; 709/204, 202, 205, 206, 709/217, 203, 223, 224, 231
See application file for complete search history.

(56) References Cited

U.S. PATENT DOCUMENTS

| | | | |
|---|---|---|---|
| 2006/0047615 A1* | 3/2006 | Ravin | G06N 5/022 706/50 |
| 2010/0153181 A1* | 6/2010 | Altunbasak | G06Q 10/0639 705/7.38 |
| 2012/0084112 A1* | 4/2012 | Bagchi | G06Q 10/063112 705/7.14 |
| 2012/0245952 A1 | 9/2012 | Halterman et al. | |
| 2012/0265578 A1 | 10/2012 | Olding et al. | |
| 2012/0278097 A1 | 11/2012 | Ghouri et al. | |
| 2013/0246327 A1* | 9/2013 | Tabrizi | G06Q 30/01 706/50 |
| 2013/0253940 A1* | 9/2013 | Zziwa | G06Q 50/22 705/2 |

* cited by examiner

*Primary Examiner* — Jay Morrison
*Assistant Examiner* — Ken Hoang
(74) *Attorney, Agent, or Firm* — Rahman LLC

(57) ABSTRACT

A response management system and method configured to allow management of responses to a case submitted by an entity in a crowdsourced network. The system includes a processing circuit that receives, from the entity over the crowdsourced network, the case. The processing circuit federates the case, into a plurality of federated cases, based on one or more parameters. The processing circuit routes the federated cases to the crowd of respondents in the network. The processing circuit receives responses from the crowd for each of the federated cases. The processing circuit integrates responses for each of the federated cases to yield a single integrated response for the case. The processing circuit publishes the integrated response anonymously that is viewable publicly.

14 Claims, 11 Drawing Sheets

CROWDSOURCED RESPONSES MANAGEMENT TO CASES

BACKGROUND

1. Technical Field

The embodiments herein generally relate to management of responses online, and in particularly to systems and methods for management of responses created by a crowd of respondents in a crowdsourced network to increase authenticity of the responses.

2. Description of the Related Art

There exist online platforms through which individuals can submit their questions and a networked agency connected to the online platform provides answers to such questions. However, such answers are not very useful because of a lack of reliability and correctness of the answers.

Therefore, there is a need for a method and system that ensures reliability and correctness of the answers by using wisdom of crowd and credentialing processes.

SUMMARY

An embodiment herein provides a response management system configured to allow management of responses to a case submitted by an entity in a crowdsourced network. The system includes a memory for storing information pertaining to the case submitted by the entity, respective responses for the case by a crowd of respondents in the crowdsourced network, and programmed instructions. The system further includes a processing circuit. The processing circuit receives, from the entity over the crowdsourced network, the case. The processing circuit federates the case, into a plurality of federated cases, based on one or more parameters including a level of complexity, technology involved, and a level of reliability and trust desired in its respective response. Each of the federated cases are associated with one or more corresponding session parameters that are indicative of a respective level of complexity, technology involved, a level of reliability and trust in response desired. The processing circuit routes the federated cases to the crowd of respondents in the network such that the routing of the federated cases is managed based on the session parameters associated with each of the federated cases. The processing circuit receives responses from the crowd for each of the federated cases. The processing circuit associates information pertaining to the responses as second session parameters that are compared with the first session parameters such that the comparison yields a degree of compliance and appropriateness of the second session parameters toward the first session parameters. In response to a degree of compliance below a threshold for one or more federated cases, an adjusted set of third session parameters are associated with the one or more such federated cases. The processing circuit routes the one or more such non-compliant federated cases to a second crowd of respondents in the network such that the routing of the cases is managed based on the third session parameters associated with each of the one or more federated cases. The processing circuit integrates responses for each of the federated cases to yield a single integrated response for the case. The processing circuit publishes the integrated response anonymously that is viewable publicly.

An embodiment herein provides a method for management of responses to cases submitted by an entity in a crowdsourced network. The method includes receiving, from the entity over the crowdsourced network, a case. The method includes federating the case, into a plurality of federated cases, based on one or more parameters including a level of complexity, technology involved, and a level of reliability and trust desired in its respective response, wherein each of the federated cases are associated with one or more corresponding session parameters that are indicative of a respective level of complexity, technology involved, a level of reliability and trust in response desired. The method includes routing the federated cases to the crowd of respondents in the network such that the routing of the cases is managed based on the session parameters associated with each of the federated cases. The method includes receiving responses from the crowd for each of the federated cases. The method includes associating information pertaining to the responses as second session parameters that is compared with the first session parameters such that the comparison yields a degree of compliance and appropriateness of the second session parameters toward the first session parameters. In response to a degree of compliance below a threshold for one or more federated cases, an adjusted set of third session parameters are associated with the one or more such federated cases. The method includes routing the one or more such non-compliant federated cases to a second crowd of respondents in the network such that the routing of the cases is managed based on the third session parameters associated with each of the one or more federated cases. The method includes integrating responses for each of the federated cases to yield a single integrated response for the case corresponding to the federated cases. The method includes publishing the integrated response anonymously that is viewable publicly.

An embodiment herein provides a program storage device readable by a computer, and comprising a program of instructions executable by said computer to perform a method for management of responses to cases submitted by an entity in a crowdsourced network. The method includes receiving, from the entity over the crowdsourced network, a case. The method includes federating the case, into a plurality of federated cases, based on one or more parameters including a level of complexity, technology involved, and a level of reliability and trust desired in its respective response, wherein each of the federated cases are associated with one or more corresponding session parameters that are indicative of a respective level of complexity, technology involved, a level of reliability and trust in response desired. The method includes routing the federated cases to the crowd of respondents in the network such that the routing of the cases is managed based on the session parameters associated with each of the federated cases. The method includes receiving responses from the crowd for each of the federated cases. The method includes associating information pertaining to the responses as second session parameters that is compared with the first session parameters such that the comparison yields a degree of compliance and appropriateness of the second session parameters toward the first session parameters. In response to a degree of compliance below a threshold for one or more federated cases, an adjusted set of third session parameters are associated with the one or more such federated cases. The method includes routing the one or more such non-compliant federated cases to a second crowd of respondents in the network such that the routing of the cases is managed based on the third session parameters associated with each of the one or more federated cases. The method includes integrating responses for each of the federated cases to yield a single integrated response for the case corresponding to the federated cases. The method includes publishing the integrated response anonymously that is viewable publicly.

BRIEF DESCRIPTION OF THE DRAWINGS

The features of the disclosed embodiments may become apparent from the following detailed description taken in conjunction with the accompanying drawings showing illustrative embodiments herein, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, reference is made to the accompanying drawings which form a part hereof, and in which is shown by way of illustration specific embodiments in which the embodiments herein may be practiced. These embodiments, which are also referred to herein as "examples," are described in sufficient detail to enable those skilled in the art to practice the embodiments herein, and it is to be understood that the embodiments may be combined, or that other embodiments may be utilized and that structural, logical, and electrical changes may be made without departing from the scope of the embodiments herein.

Figure 1:
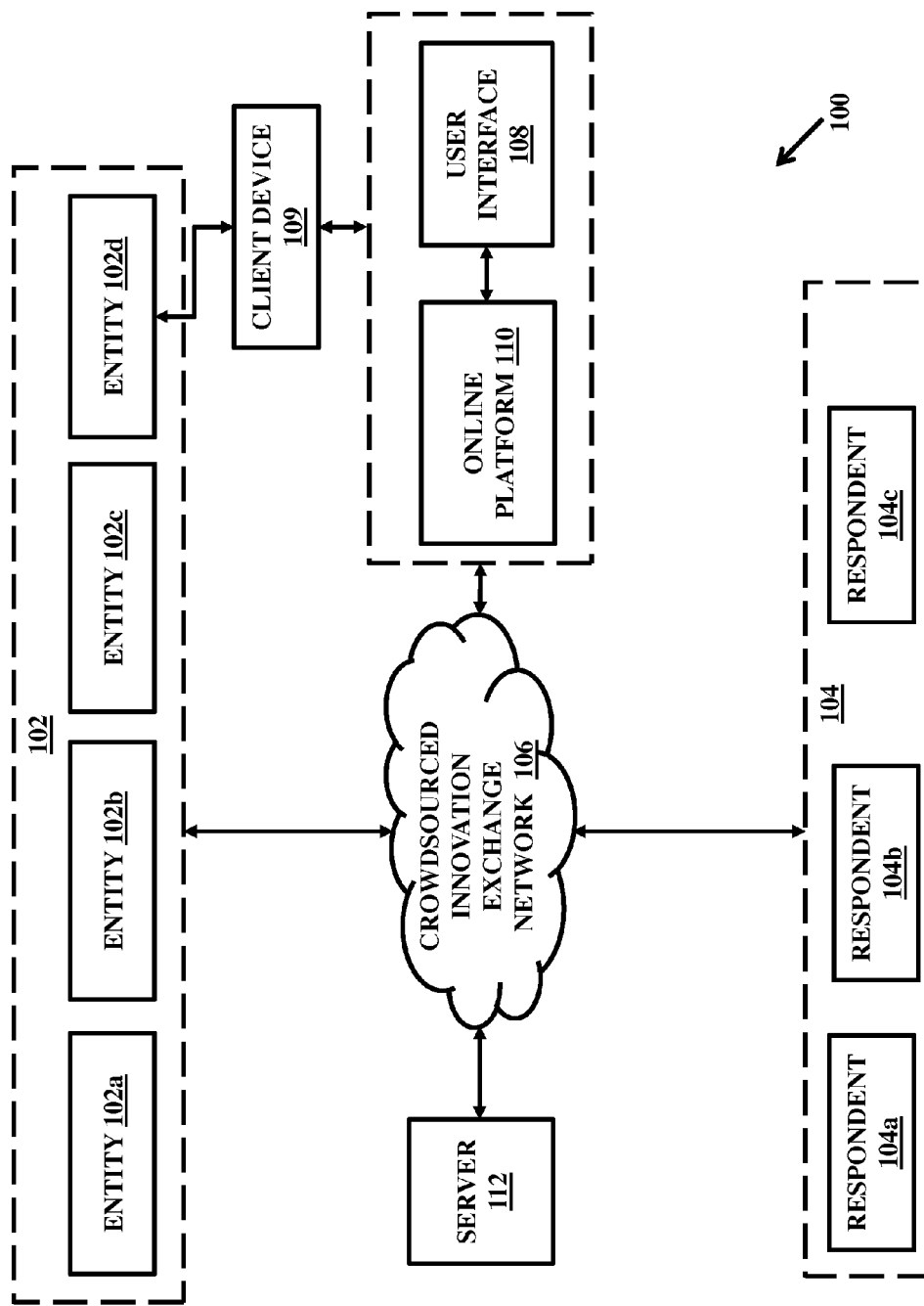
FIG. 1 illustrates an example of an ecosystem to allow management of responses to cases submitted by an entity in a crowdsourced network according to an embodiment herein.

FIG. 1 illustrates an example of an ecosystem 100 to allow management of responses to cases submitted by an entity in a crowdsourced network 106. The ecosystem 100 includes a plurality of entities 102 (e.g., entities 102a-102d) that can submit queries or cases for analysis and responses from a crowd through a user interface 108 accessible over an online platform 110 that can be accessed through a client device 109. The user interface 108 may be a graphical interface. The ecosystem 100 further includes a plurality of crowdsourced respondents 104 (e.g., respondents 104a-104c) that facilitate in analysis and creation of responses by analyzing the cases and writing analysis comments and responses for the cases submitted by the plurality of entities 102. The plurality of entities 102 and respondents 104 are connected to the crowdsourced network 106. The ecosystem 100 further includes a server 112 coupled communicatively to the crowdsourced network 106.

The network 106 can employ a wireline or a wired communication channel or both. The wireless communications network may include for example, but not limited to, a digital cellular network, such as Global System for Mobile Telecommunications (GSM) network, Personal Communication System (PCS) network, or any other wireless communications network. The wire line communications network may include for example, but not limited to, a Public Switched Telephone Network (PSTN), proprietary local and long distance communications network, or any other wire line communications network. In addition, the network 106 may include for example, digital data networks, such as one or more local area networks (LANS), one or more wide area networks (WANS), or both LANS and WANS. One or more networks may be included in the crowdsourced network 106 and may include both public networks such as the Internet, and private networks and may utilize any networking technology and protocol, such as Ethernet, Token Ring, Transmission Control Protocol/Internet Protocol (TCP/IP), or the like to allow interaction with the ecosystem.

The entities 102 can include one or more of a patient, physician, doctor, surgeon, healthcare expert, any other healthcare professional, or any other professional from other industry such as energy, financial, transportation, logistics, and numerous other industries. The respondents 104 may include one or more of a physician, doctor, surgeon, healthcare expert, any other healthcare professional or healthcare organization such as a hospital, or any other professional or expert from other industry such as energy, financial, transportation, logistics, and numerous other industries, or any other person or organization or institution.

The entities 102 and respondents 104 may be operatively connected with, for example, any type of electronic data processing system or communication device or the client device connected to the communications network. Examples of such an electronic data processing system or client device may include personal computer systems, such as desktop or laptop computers, workstation computer systems, server computer systems, networks of computer systems, personal digital assistants (PDAs), wireless communications devices, portable devices, or any other electronic data processing system. The client devices or data processing systems can include hardware/software computing devices capable of various computational tasks associated with the invention. These tasks can be performed through stand alone application, via Web browser graphical user interface (GUI), or via a Rich Internet Interface (RII). An embodiment herein may be implemented as computer software incorporated as part of an online social networking system.

In accordance with various embodiments, the cases can be medical cases or cases related to any other industry such as finance, energy, infrastructure, engineering, science, research, and the like. In an embodiment, the cases can include a query about a medical problem, disease, diagnostics, or treatment, and the like. For example, a medical case may include an individual's medical history, ongoing treatment, and treatment plan in future and a question appended with the case for which an answer is sought. In an example, a response may include an answer for a question posted by an entity. In some embodiments, the medical case may simply be a question posted by an entity.

The ecosystem 100 thus provides a platform for aggregating cases or questions and answers or responses on an online platform communicatively coupled to a crowdsourced community of the entities 102 and respondents 104. The ecosystem 100 facilitates finding faster answers to simple or complex cases through wisdom and analysis of crowds. In an embodiment, the platform may facilitate exchange of medical information by submission of medical cases or questions and finding answers or responses through the wisdom of crowds. A patient, parent of a patient, a hospital, etc. can submit to this platform a partial or complete medical case including images, documents, etc. and "the crowd" of the respondents 104 can help perform research and provide answers to the patient or their representative.

Figure 2:
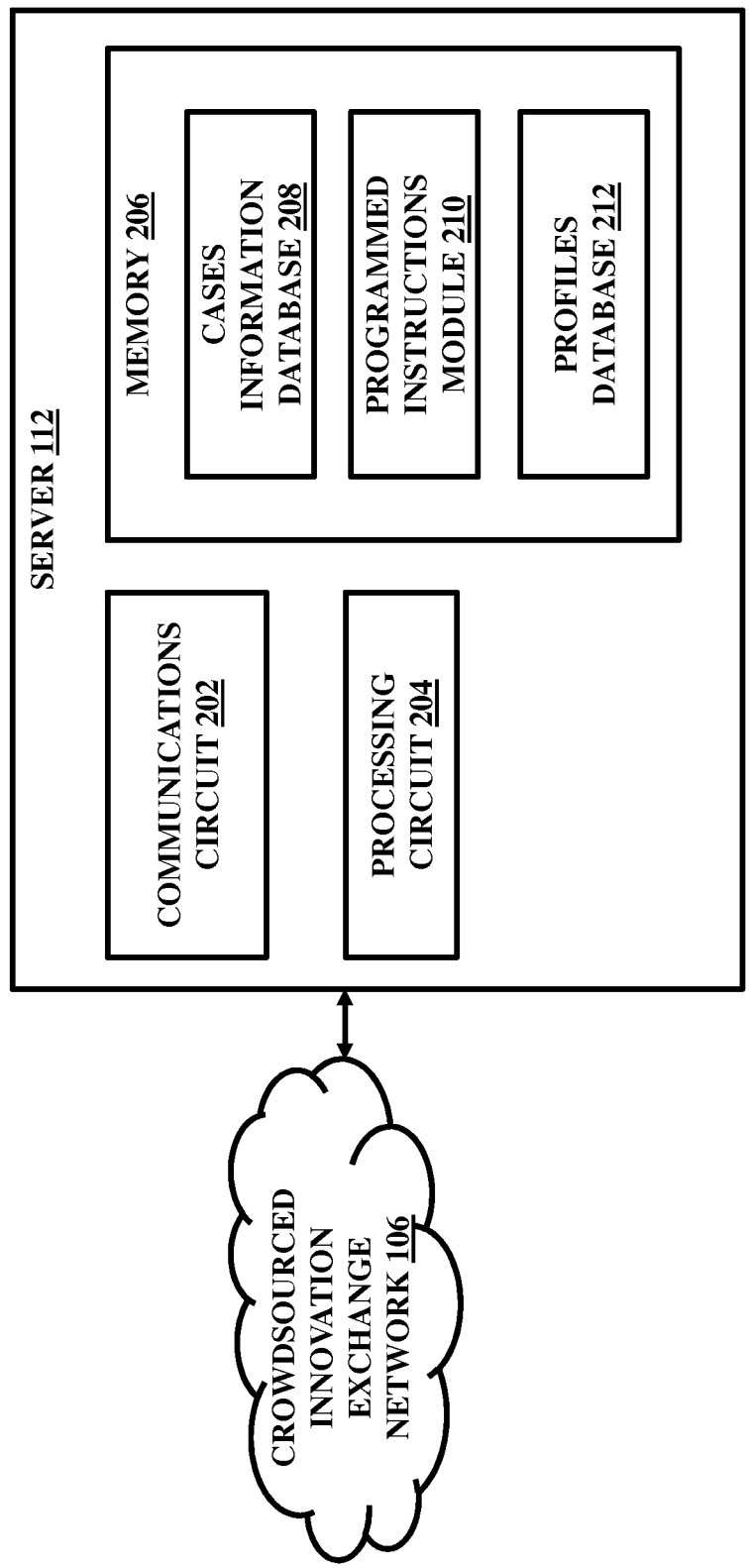
FIG. 2 illustrates an example of a server in accordance with an embodiment herein.

FIG. 2, with reference to FIG. 1, illustrates an example of the server 112 in accordance with an embodiment herein. The server 112 includes a communications circuit 202, a processing circuit 204, and a memory 206.

The memory 206 stores information pertaining to a query or a case submitted by an entity 102a or any other entity. The memory 206 further stores respective responses for the case by the crowd of respondents 104 in the crowdsourced network 106. The memory 206 further stores programmed instructions for performing various tasks pertaining to the invention. The memory 206 includes for example a cases information database 208, programmed instructions module 210, and a profiles database 212. The cases information database 208 stores information about cases or portions thereof and the responses for the respective cases and portions thereof. The programmed instructions module 210 stores various programmed instructions for use in performing various tasks pertaining to the invention. The profiles database 212 stores profiles of each of the entities 102 and the respondents 104, and various other experts or other persons that may be considered in future for writing responses to various cases.

The communications circuit 202 can be any input/output module. In some embodiments, the communications circuit 202 is configured to connect to a plurality of devices, such as an input module, an output module, and a display device.

The server 112 includes the processing circuit 204. The processing circuit 204 is configured to receive, from an entity 102a over the crowdsourced network 106, a case such as a medical case without limitations. The processing circuit 204 federates the medical case, into a plurality of federated cases, based on one or more parameters. The one or more parameters may include a level of complexity, technology involved, and a level of reliability and trust desired in its respective response by the plurality of respondents 104. In an embodiment, each of the federated cases is associated with one or more corresponding first session parameters. The session parameters are indicative of a respective level of complexity, technology involved, a level of reliability and trust in response desired.

The processing circuit 204 routes the federated medical cases to the crowd of respondents 104 or the plurality of respondents 104 in the network 106 such that the routing of the medical cases is managed based on the first session parameters associated with each of the federated medical parameters. For example, during routing of the federated cases, the processing circuit 204 may identify a federated medical case and its technology by reading its session parameter corresponding to the case technology. Based on identification of the technology, the processing circuit 204 may route the medical case to a set of respondents 104 who are well versed or expert in the relevant technology as identified through the session parameter. Similarly, another first session parameter may be associated with the medical case that defines level of reliability needed in responses for the federated medical case. Accordingly, the processing circuit 204 may share the medical case to those respondents 104 who are capable of delivering value to an extent of desired reliability. In such cases, the respondents 104 may be screened based on their expertise, qualification, age, credentialing, affiliations, accreditations, and the like. In an embodiment, a level of reliability and trust is controlled by using a crowdsourcing index (CI) (discussed later) that is indicative of a crowd of respondents 104 such that the CI and the level of reliability and trust bear a non-linear relationship with one another. In an embodiment, the CI is defined in a way that the number of respondents 104 bears a non-linear relationship with the reliability and trust level. In an embodiment, the relationship is exponential in nature such that with a unit increase in the number of respondents 104 for a federated case, the reliability and trust increases exponentially.

The respondents 104 review the federated medical cases and write answers or responses for the medical cases or questions thereof. The responses may include content, video clips, audio files, or any other type of information. The processing circuit 204 receives responses from the crowd for each of the federated medical cases. In some embodiments, a single federated case is shared with the crowd of respondents 104. Therefore, a plurality of responses are received by the processing circuit 204 for each of the federated cases. The crowdsourced responses from the plurality of respondents 104 increase reliability and authenticity of the responses. In an embodiment, the number of crowdsourced respondents 104 can be 100. In another embodiment, the number of crowdsourced respondents 104 can be 500 or 1000 or even higher. In an embodiment, a crowdsourcing index (CI) may be associated with each of the responses such that the CI defines a non-linear relationship with an output derived from the responses. In an embodiment, the CI is defined in a way that the number of respondents 104 bears a non-linear relationship with the output. For example, output may be reliability or trust or authenticity of the responses. The authenticity or reliability may therefore increase non-linearly as the number of respondents 104 associated with a particular federated case increase.

The processing circuit 204 associates information pertaining to the responses as second session parameters. For example, the processing circuit 204 identifies and records information pertaining to the technology expertise of a respondent 104a writing a response for a federated medical case. The information is defined through the use of a second session parameter corresponding to the technology. Similarly, various other second session parameters may be defined for other factors such as including without limitations capability of managing complexity by the respondent 104a, credentialed expertise of the respondent 104a, affiliation and accreditation of the respondent 104a, and the like. While the first session parameters are indicative of desired characteristics in the responses from the crowd of respondents 104, the second session parameters are indicative of actual characteristics of the responses. A comparison between the first session parameters and the respective and related second session parameters is indicative of the value and reliability of the responses. For example, in some embodiments, a first session parameter corresponding to a complexity level of a federated medical case can be compared with a second session parameter corresponding to a level of complexity that a respondent 104a is capable to handle. If the second session parameter yields a value higher than the corresponding first session parameter, the response may be considered valuable. The various such responses from the crowd can so be managed and accordingly value of the response from an overall effect of the crowd can be determined, also considering an impact of the CI as discussed above. In another example, the first session parameter that may be indicative of a desired trust and reliability can be compared with a related second session parameter indicative of credentialed expertise of a respondent 104a that govern reliability of the respondent 104a. The comparison may result in identification of whether the respondent 104a is authorized and expert enough to comment on the federated medical case and also in identification of the extent of expertise. The comparison also thus results in determination of a value of such a response by the respondent 104a. If the comparison is highly positive, the response may be considered as highly valuable or otherwise.

In some embodiments, the comparison between the first session parameters and the second session parameters yields a degree of compliance and appropriateness of the second session parameters toward the first session parameters. In some embodiments, a threshold limit may be defined such that in response to a degree of compliance below a threshold for one or more federated medical cases, an adjusted set of third session parameters are associated with the one or more such federated medical cases by the processing circuit 204. The adjusted set of third session parameters are indicative of a lag between the first and the second session parameters or in another words are indicative of an extent of inappropriateness of the responses for the federated medical cases in light of the complexity, technology, reliability desired, expertise desired, crowdsourced number desired, CI desired, and the like. The adjusted set of third session parameters or simply third session parameters require further evaluation of the federated medical cases for determining accurate responses or updating of responses such that the further modifications at least make up the lag between the first and session parameters to an extent that the lag does not go beyond the defined threshold.

The adjustment according to the third session parameters can be performed by decreasing or increasing the CI, in some embodiments. In some embodiments, the adjustment can be made by increasing the number of respondents 104 in the crowd for writing a response to a federated medical case, that is by sharing the case with more respondents 104 and evaluating responses from them as well. In some embodiments, the adjustment can be made by routing the federated cases to respondents 104 with a higher credentialed expertise. In some embodiments, the adjustment can be made in several other ways without limiting the scope and spirit of the invention. Accordingly, the processing circuit 204 routes one or more such non-compliant federated cases to a second crowd of respondents in the network such that the routing of the cases is managed based on the third session parameters associated with each of the one or more federated medical parameters.

Upon receipt of responses from the second crowd of respondents, the processing circuit 204 integrates responses for each of the federated cases to yield a single integrated response corresponding to the federated cases. The integration of the federated responses may be performed using various algorithms and mathematical computations without limiting the spirit and scope of the invention.

Subsequently, the processing circuit 204 publishes the integrated response anonymously over an online or any other platform. The response is viewable publicly along with the corresponding original case for which the response is developed. In some embodiments, detailed analysis and evaluation of the response can be accessed by selected participants, for example by an entity who submits the response, after a paid subscription and after permissions granted by the respondents 104.

In an embodiment, the integrated response is published anonymously. In an embodiment, the integrated response is published as partially anonymous such that the entity such as 102a is allowed to access profiles of the respondents 104 anonymously.

In some embodiments, the level of reliability and trust as discussed above is controlled by using the crowdsourcing index (CI) that is indicative of a crowd of respondents 104 such that the CI and the level of reliability and trust bear a non-linear relationship with one another. In an embodiment, the CI is defined in a way that the number of respondents 104 bears a non-linear relationship with the reliability and trust level. In some embodiments, the relationship is exponential in nature such that with a unit increase in the number of respondents 104 for a federated case, the reliability and trust increases exponentially.

Figure 3:
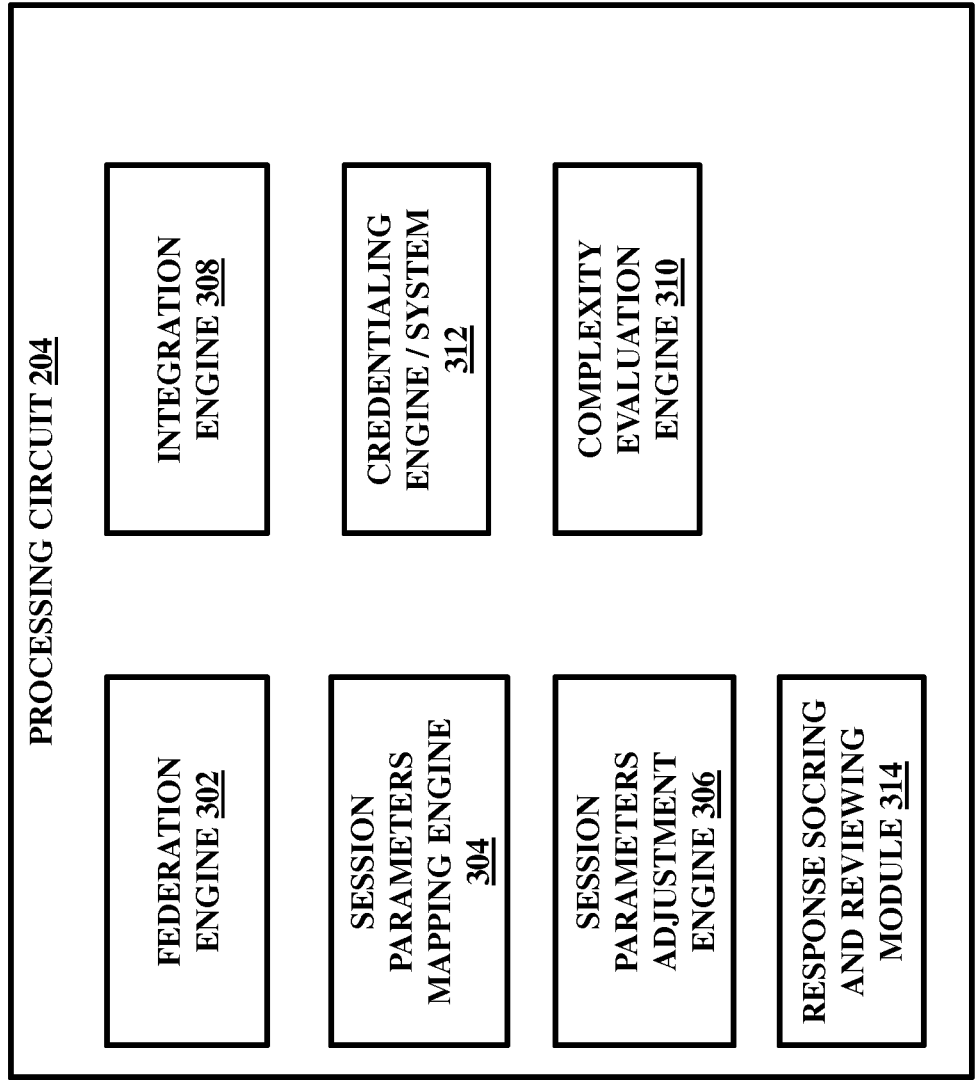
FIG. 3 illustrates an example of a processing circuit 204 in accordance with an embodiment herein.

As shown in FIG. 3, with reference to FIGS. 1 and 2, in some embodiments, the processing circuit 204 comprises a federation engine 302 that federates the medical case, into the plurality of federated cases, based on the one or more parameters including the level of complexity, technology involved, and the level of reliability and trust, and the like.

The processing circuit 204 further includes a session parameters mapping engine 304 that is configured to compare the first session parameters with the second session parameters, and compare the second session parameters with the third session parameters. The session parameters mapping engine 304 generates a correlationship map between each of the first session parameters and the second session parameters, and the second session parameters and the third session parameters, wherein the correlationship map is indicative of the compliance.

In some embodiments, the processing circuit 204 further includes a session parameter adjustment engine 306 to determine the adjusted third session parameters based on a comparison of the second session parameters with the first session parameters in view of the threshold level.

In some embodiments, the processing circuit 204 includes an integration engine 308 to integrate the responses for the federated medical cases corresponding to the medical case. In various embodiments, the case may be a medical case, financial case, technological case, engineering case, scientific case, research case, or any other case. In some embodiments, the medical case can include one or more of a video clip, an image, and a document relating to a patient, hospital, disease, treatment, caretaker, doctor, or any other related entity. In some embodiments, the entity can be one or more of a patient, patient representative including a hospital, guardian, parent, and a caretaker of the patient, or any other person, or organization. In embodiments, the medical case submitted by the entity is either a complete or a partial medical case.

In some embodiments, the processing circuit 204 further includes a complexity evaluation engine 310. The complexity evaluation engine 310 evaluates complexity of various portions of the medical case prior to federating the case into the federated cases based on the level of complexity of the portions. In an embodiment, the complexity evaluation engine 310 evaluates complexity of the various portions of the medical case based on inputs from a plurality of crowdsourced persons. In some embodiments, complexity levels are identified by using a crowdsourcing index (CI) that is indicative of a crowd of persons such that the CI and the complexity levels bear a non-linear relationship with one another. In an embodiment, the CI is defined in a way that the number of respondents 104 bears a non-linear relationship with the complexity levels.

In some embodiments, the processing circuit 204 may include a credentialing engine 312, discussed later in conjunction with FIGS. 4 through 6. In some embodiments, the processing circuit 204 may include a response reviewing and scoring module 314, discussed later in conjunction with FIG. 7. In embodiments, the output generated by the credentialing engine 312 and the response scoring and reviewing module 314 may be used by the processing circuit 204.

Figure 4:
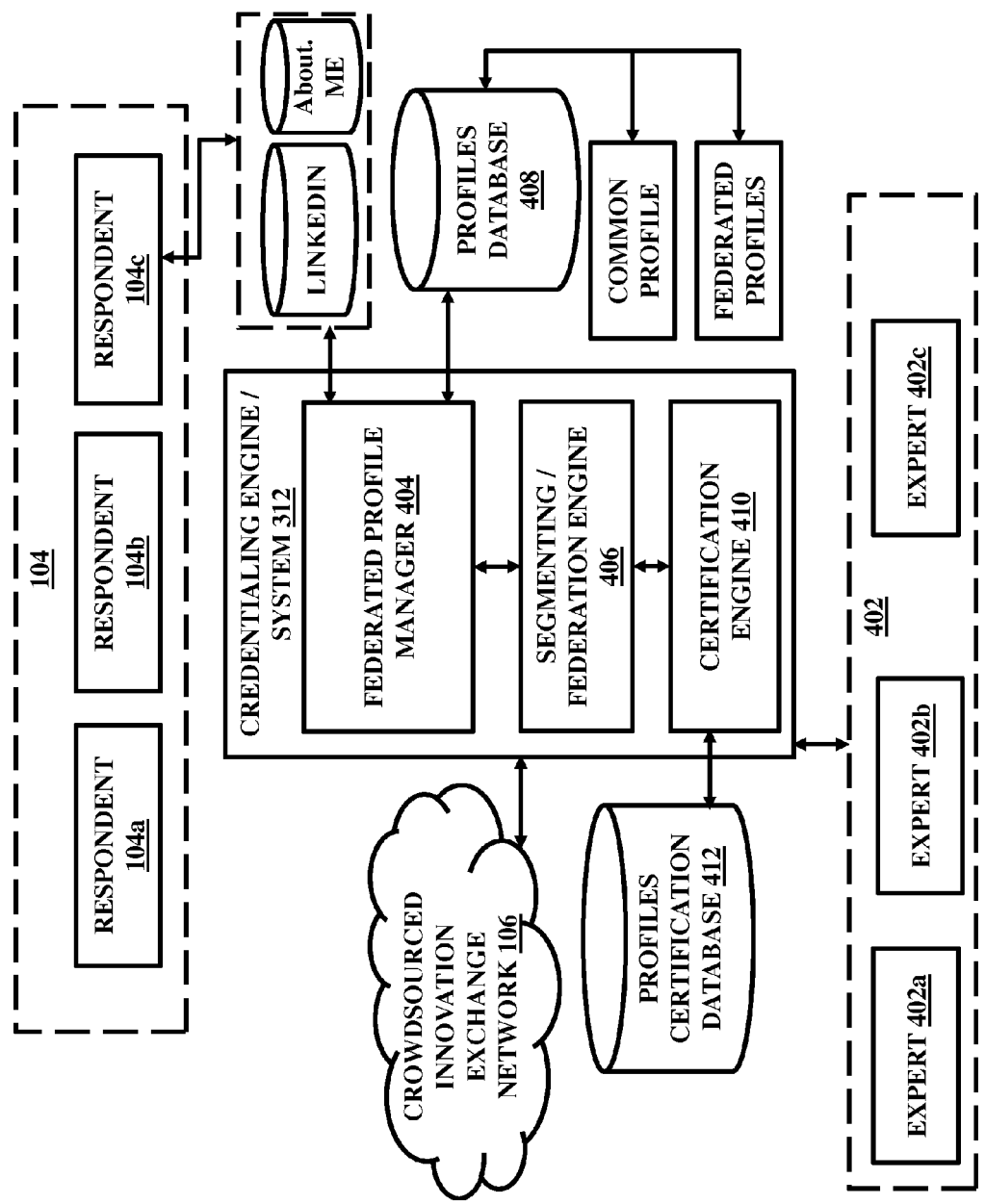
FIG. 4 illustrates generally, but not by the way of limitation, among other things, an exemplary operating environment for crowdsourced credentialing of respondents.

FIG. 4, with reference to FIGS. 1 through 3, illustrates generally, but not by the way of limitation, among other things, an exemplary operating environment for crowdsourced credentialing of the respondents 104 (e.g., respondents 104a-104c). The environment includes the plurality of respondents 104 and a plurality of experts 402 (e.g., experts 402a-402c) connected in the crowdsourced network 106. The credentialing system or engine 312 is connected with the network 106 and is accessible by the experts 402 and the respondents 104 through the network 106 using for example a web-based interface or portal (not shown in FIG. 4).

The experts 402 may include one or more of a physician, doctor, surgeon, healthcare expert, any other healthcare professional or healthcare organization such as a hospital, or any other professional or expert from other industry such as energy, finance, transportation, logistics, and numerous other industries, or any other person who may be interested in credentialing or accreditation process of the respondents 104 or may be any person related to the respondents 104 and who may provide a trusted response or comment on information about the respondents 104 such as qualifications, work history and the like. A plurality of industry related or other agencies such as hospitals, nursing centers, research institutes, financial companies, financial agencies, transportation agencies, logistic companies, energy related agencies, and others or hiring agencies or placement agencies may also access the credentialing system 312 to receive credentialing or verification services provided by the system 312 for the plurality of respondents 104. In such embodiments, the system 312 may provide the services to such agencies based on credentialing of the information of the respondents 104 obtained by the experts 402.

The credentialing system 312 provides a technical capability and a federation model such that profiles of the respondents 104 may be created including details about the respondents 104 and stored in the system 312. The details may include demographic information, personal information, educational background, work history or any other similar information. These profiles can be shared with the plurality of experts 402 based on set standards and preferences and rules to implement a federated exchange capability wherein distinct portions of the profiles can be credentialed or accredited or verified and shared or exchanged with the experts 402 in a federated manner. The system 312 further provides a credentialing and verification and accreditation capability such that profiles of each of the respondents 104 may be credentialed or verified or accredited by the experts 402 such that the entire credentialed information or profiles available and credentialed through federated sources is accessible at a single location from the system. In some embodiments, the system 312 further provides a capability to create a federated model of the profiles such that the federated segments or portions or profiles, as will be discussed later in detail, may be verified or credentialed distinctly by distinct federated experts 402 in the crowdsourced network 106 such that the crowdsourcing increases the level of trust and authenticity and reliability of the credentialing and credentialed information due to cumulative effect of several federated verifications by the crowdsourced experts 402 for the same segments of the profiles.

The credentialing system 312 as shown includes a federated profile manager 404, a segmenting or federation engine 406, and a certification engine 410 discussed below.

The federated profile manager 404 is configured to receive information for profile creation from the plurality of respondents 104. The federated profile manager 404 is responsible for maintaining the information thus received from the respondents 104 and modify it as per updates from the respondents 104. The federated profile manager 404 is configured to be linked to several sources of information that have respondents' presence such as for example their social networks including social networking websites, their educational institutions, work environments and the like. The federated profile manager 404 collects information from a plurality of sources for each of the respondents 104 and collates the records and information in the form of a single common profile of each of the respondents 104 that are associated with and communicate with the system 312. The profile manager 404, for example may collect information from federated sources such as Linkedin, Myspace, About.Me, education institutions, workstations, and the like. The common profile maintained by the system may be viewable by the respondents 104, experts 402, relevant organizations, or any other persons or entities 102 associated with or subscribed to the system 312. In some embodiments, the federated profile manager 404 may automatically retrieve the profile information from the social networks. In other embodiments, the federated profile manager 404 may maintain information that is submitted by the respondents 104 voluntarily.

The federated profile manager 404 may allow the respondents 104 to maintain their profiles in the system 312 and protect the information in their profiles and their attention from inappropriate access, and makes their personal profiles connectable. The credentialing system 312 may further enable the profiles and information therein as searchable by the experts 402 and the respondents 104. In doing so, the experts 402 or respondents 104 may use a web-based interface to access the user interface or portal of the system 312. The experts 402 can then create their profiles and update profile information using the user interface after an initial registration process.

In some embodiments, once a respondent such as 104a joins the network 106 and subscribes with the credentialing system 312, the information included in the profiles is ready for credentialing, verification, accreditation, or any other such purpose. The entire profiles can thus be credentialed or verified by the crowdsourced experts 402. The credentialing may also determine the profiles as accurate or inaccurate, trustable or non-trustable, authentic or unauthentic, fraud or genuine etc.

In embodiments, once the plurality of respondents 104 joins the network, the profiles are segmented into distinct portions or segments referred to as federated profiles by the federation or segmenting or federation engine 406. The segmenting engine 406 is configured to receive the common profiles from the profile manager 404 and segment them into the federated portions or segments or profiles. In an example, the federation engine 406 fragments a common profile of a respondent 104a into a plurality of federated profiles based on commonalities in content of the federated profiles. The federated profiles are treated as distinct profiles for the purpose of credentialing separately by the crowdsourced experts 402. For example, a common profile P of a respondent 104a may include the following details:
Name: Amir A.
Age: 38 years
Sex: Male
Location: Texas, US
Education: B.S in Computer Science from Purdue University (1995)

M.S. in Computer Science from Purdue University (1997)
M.B.A. in Strategic Management (2005) from Kellogg School of Management
PhD, Competitive Strategies (2011) from Kellogg School of Management
Certifications and Awards:
   Certification by Microsoft
   Certification of Proficiency in Networking Technologies
   Best Student award in 1994 by Purdue University
Work Experience:
   ABC: 1997-2003
   SDF: 2003-2005
   XCV: 2011-now For the purpose of simplicity of description, only some specific details are included as an example in the above profile, however several other details may also be included without limitations. The segmenting engine 406 may be configured to segment the profile into distinct federated profiles. In an example, the taxonomy of the profiles may be "official" and centrally managed or may be extended by any of the federation partners.

In some embodiments, the above common profile may be segmented by the segmenting engine 406 into several federated profiles as below:
Segment 1: First Name—Amir
Segment 2: Lat Name—A.
Segment 3: Middle Name—Null
Segment 4: Sex—Male
Segment 5: Location (Area)—Texas
Segment 6: Location (Country)—US
Segment 7: Education—B.S.
Segment 8: B.S. in year—1995
Segment 9: Education—M.S.
Segment 10: M.S. in year—1997
Segment 11: B.S. from University/Institute—Purdue University
Segment 12: M.S. from University/Institute—Purdue University
Segment 13: Education—M.B.A
Segment 14: MBA from university/institute—Kellogg School of Management
Segment 15: MBA in year—2005
Segment 16: MBA specialization—Strategic Management
Segment 17: Education—PhD
Segment 18: PhD from University/Institute—Kellogg School of Management
Segment 19: PhD in year—2011
Segment 20: PhD work—Competitive Strategies
Segment 21: Certification—by Microsoft
Segment 22: Certification of proficiency
Segment 23: Certificate of Proficiency in stream—Networking Technologies
Segment 24: Award: Best Student
Segment 25: Award of Best Student received in year—1994
Segment 26: Awarded by—Purdue University
Segment 27: Work Experience—ABC
Segment 28: ABC tenure begins in—1997
Segment 29: ABC tenure ends in—2003
Segment 30: Work Experience—SDF
Segment 31: SDF tenure begins in—2003
Segment 32: SDF tenure ends in—2005
Segment 33: Work Experience—XCV
Segment 34: XCV tenure begins in—2011
Segment 35: XCV tenure ends in—continuing now As discussed above, a single common profile is segmented by the segmenting engine 406 in thirty-five discrete federated profiles that are distinct in one or the other ways. In accordance with various embodiments, the segmenting engine 406 can be configured to segment a common profile in as many discrete federated profiles as possible. Therefore, the entire information contained in a common profile is segmented into several discrete federated profiles. For example, the above discussed common profile is converted into thirty-five such federated profiles. Upon segmenting, the federated profiles may be communicated to the federated profile manager 404. Thus, the federated profile manager 404 stores common profiles as well as federated profiles associated with the professionals or respondents 104 in the profiles database 408.

The segmenting engine 406 may include hardware and software components capable of computational tasks associated with segmenting of the common profiles into the federated profiles. Once segmented by the segmenting engine 406, the federated profile manager 404 may further classify the federated profiles or segments into groups of federated profiles for the same respondents 104 so that the groups may include similar federated profiles based on certain parameters. For example, the work experience related federated profiles 27, 30, and 33 that define different companies where a respondent was employed and is employed may be grouped together do define another type of profile referred to herein as a sub-profile. Similarly, various other groups may be formed to create various other sub-profiles based on several possible combinations of the federated profiles or segments or profile portions. The credentialing system 312 thus can facilitate maintaining of the common profiles, sub-profiles and the federated profiles for the same experts thus providing a three level profile management facility. It must be appreciated that this document uses the term portion, segment and federated profile interchangeably without limitations.

The credentialing system 312 further includes the certification engine 410 coupled to the segmentation engine 406 and the federated profile manager 404. The certification engine 410 is configured to allow the plurality of crowdsourced experts 402 to respond to the segmented and classified profiles associated with the plurality of respondents 104 and credential them. The credentialing of each of the segmented portions or federated profiles associated with a respondent 104a contributes to credentialing of the entire profile of the respondent 104a upon collation of the credentialed portions. For example, the exemplary profile as discussed above includes thirty-five segments. The credentialing of each of the segments influences overall credentialing of the entire common profile. Therefore, if all the thirty-five segments are credentialed and verified as correct by one or more experts, a trust may be associated about the profile information and the information may be considered as true or authentic. As more and more crowdsourced experts 402 verify the information in the federated profiles, the trust associated with the respective segments increases. Further, the crowdsourcing index may be associated to indicate and factor in the level of crowdsourcing. In an example, the crowdsourcing index may bear a non-linear such as exponential relationship with the number of experts. In an embodiment, the CI is defined in a way that the number of respondents 104 bears a non-linear relationship with the reliability and trust level. Therefore, the degree of reliability and trust may increase non-linearly as more and more experts 402 credential a respondent 104a. Therefore, the crowdsourcing may facilitate in credentialing more accurately and with a higher reliability of the federated profiles than that credentialed from only a few sources. Further, the overall accuracy of the common profile may be determined based on a cumulative effect of accuracy of each of the federated profiles. For example, if the first ten of the segments from the above common profile are verified and the remaining twenty-five segments are not verified due to no response from the experts 402, this may not yield an overall high accuracy of the common profile and may still require credentialing and verification of the remaining segments but may be considered as acceptable to a certain extent. On the contrary, if the remaining twenty-five segments are rejected and verified as wrong information by the experts 402, the overall common profile may be considered as inaccurate. Further, since the discrete federated profiles associated with a respondent 104*a* are credentialed from the plurality of crowdsourced experts 402, there may be a high level of accuracy in the credentialing and the credentialing may be considered as highly authentic and reliable.

The credentialing information when credentialed for each of the federated profiles is more accurate and valid and acceptable than the common profile verified in entirety where special attention may not be paid to every record of the common profile. Secondly, the degree of acceptance of credentialing information is much higher through crowdsourcing than for a single verification by a single source. Therefore, according to some embodiments herein, number of sources credentialing a particular federated profile may be associated with each of the segments to indicate a level of accuracy of the credentialing information. For example, if a federated profile is credentialed and verified by eighteen sources in the network 106, it may be considered as highly acceptable. Also, the relevant information about credentialing such as who credentialed, when credentialed may also be associated with each credentialing of each of the segments so that an authenticity may be judged by associating an overall impact of the federated profiles' credentialing, number of times credentialed, and trust factor about the source who verified and relevance about the time when verified. Therefore, in such embodiments, a multi-scaled and cumulative score may be determined and multi-scaled and cumulative credentialing may be done based on the multi-scaled cumulative score determined. Further, since a single federated profile may be verified by the plurality of crowdsourced experts 402, therefore the credentialing system 312 may determine an extent of inconsistency between several credentialing by several different experts for the same federated profile. In this manner, the system 312 may be configured to determine an index of inconsistency depending on distribution of differences across several credentialing by the several experts 402. The credentialing system 312 may be configured to generate a map indicating extent and coverage of inconsistencies among the several responses and credentialing for the same federated profiles. The map together with the inconsistency index may facilitate in determination of a level of trust in the overall credentialing of the same federated profile. This process may be repeated for each of the federated profiles for a common profile of a respondent and thus may determine an overall index of inconsistency and overall distribution map and overall trust factor for the common profile.

In some embodiments, various organizations or agencies, such as, for example document reviewing and inventions or ideas evaluation agencies may use the credentialing information, index of inconsistency, and distribution map as obtained from the system. The credentialing information may include information such as who verified or credentialed, when verified, how many times verified, how many different and unique verifications, trust factor associated with each verification based on such as a respondent's relationship with an expert or any other factor, and other similar information. In some embodiments, the credentialing information may be used by the respondents 104 themselves so that they can use the credentialing information as a proof of expertise and submit it along with various application forms to companies, hiring agencies, firms, healthcare centers, hospitals or any other agency or organization, financial institutions, energy related companies, logistic companies, transportation companies, and the like. Various types of information such as demographic, personal work history, educational information, affiliation with hospitals or institutes etc. can be credentialed. The credentialed information may include such as person's name, address, practice specialties, appointment status, hospital associations, credentials (including educational background, internships, and residency programs), state licensing information, malpractice liability insurance information, and personal and professional references. This entire information may be stored in the profiles database 408 maintained by the federated profile manager 404.

In some embodiments, the certification engine 410 may be coupled to or may include a profiles certification database 412. The profiles certification database 412 may include the credentialing information as discussed above. In some embodiments, the profiles certification database 412 may be included within the profiles database 408 only, and thus a single database may include memory spaces for storing the profiles information and the certification or credentialing information.

In some embodiments, in creating the common profile and uploading profile information in the database, a separate application form may be completed for each professional participating in and using the benefits of the system 312. The information in the application form may be preferably provided to the profiles database 408, which may store respondents' profile information using the system 312. The information may be stored as a series of logically organized respondents' profiles and may be extracted as necessary during segmentation by the segmenting engine 406. In some embodiments, the process of segmenting may be initiated by the segmenting engine 406 automatically as and when new information is added or updated. In case the past information is modified, the segmentation task is performed again to update the federated profiles and perform credentialing of the updated federated profiles once again. In such cases, only relevant credentialing may be needed to be revised depending on the updates instead of rejecting the entire past federated profiles and credentialing information associated with them.

Figure 5:
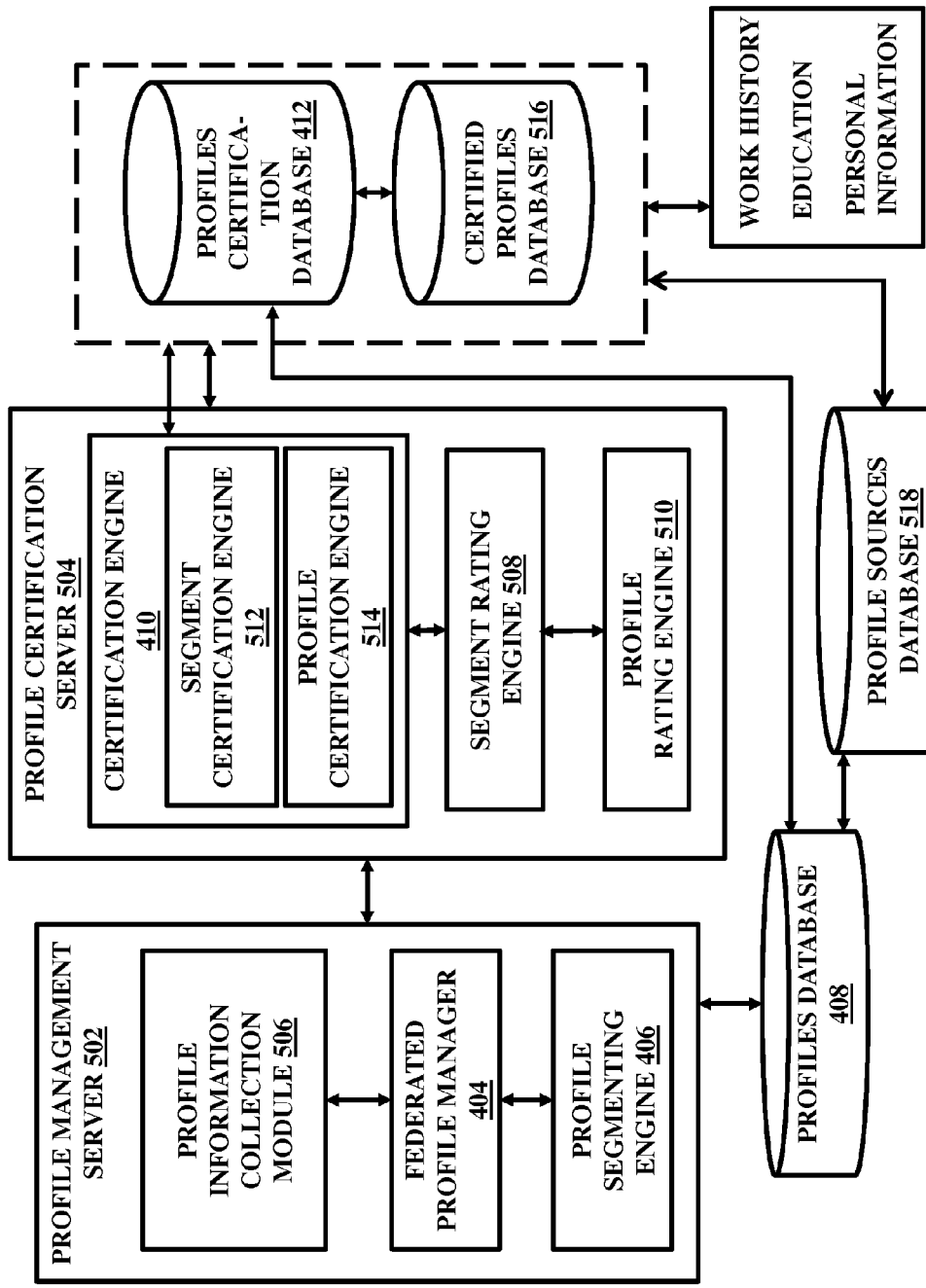
FIG. 5 illustrates a credentialing system in accordance with an embodiment herein.

FIG. 5, with reference to FIGS. 1 through 4, illustrates the credentialing system 312 in accordance with an embodiment. As shown, the system 312 may include a profile management server 502 and a profile certification server 504. The profile management server 502 includes a profile information collection module 506, the federated profile manager 404, and the profile segmenting engine 406.

The profile information collection module 506 may be configured to generate information about the plurality of respondents 104. In some embodiments, the profile information collection module 506 can be disposed separately from the federated profile manager 404; while in other embodiments it can be included in or coupled to the federated profile manager 404. The profile information pertaining to profiles of the plurality of respondents 104 can be generated by distributing application forms through a graphical user interface (not shown in FIG. 5) accessible by the respondents 104 such that the respondents 104 can fill the forms and submit with the system 312. The information can be transformed in the form of profiles by the federated profile manager 404. The segmenting engine 406 may then use the profiles information and perform the task of segmenting of the common profiles into the federated profiles associated with each of the respondents 104.

The profile certification server 504 may be communicatively coupled to or included in the profile management server 502. The profile certification server 504 may include the certification engine 410, a segment rating engine 508, and a profile rating engine 510. The certification engine 410 may further include a segment certification engine 512 and a profile certification engine 514.

The segment certification engine 512 may be configured to facilitate credentialing or certification of the federated profiles associated with the common profiles associated with each of the respondents 104. The segment certification engine is configured to allow the plurality of crowdsourced experts 402 to respond to the federated profiles associated with the common profiles of the plurality of respondents 104 and credential them. The credentialing of each of the federated profiles associated with the common profiles of each of the respondents 104 contributes to credentialing of the entire common profile of the respondents 104 upon collation of the credentialed federated profiles. As more and more experts 402 from the plurality of crowdsourced experts verify the information in the federated profiles, the trust associated with credentialing of the respective federated profiles increases. Therefore, the crowdsourcing may allow credentialing of the federated profiles to a higher degree of accuracy and reliability. Since the discrete federated profiles associated with a respondent 104a are credentialed from the plurality of crowdsourced experts 402, the credentialing defines a high level of accuracy and may be considered as highly authentic and reliable and acceptable by third parties or agencies. Moreover, the crowdsourcing index may be associated to factor in the effect of crowdsourced credentialing as discussed above.

The segment certification engine 512 is adapted to certify the stored federated profiles relating to the respondents 104 who must have their credentials verified. According to some embodiments herein, a number of sources credentialing a particular federated profile may be associated with each of the segments to indicate a level of accuracy of the credentialing information. Also, the relevant information about credentialing such as who credentialed, when credentialed may also be associated with each credentialing of each of the federated profiles so that an authenticity may be judged by associating an overall impact of the federated profiles' credentialing, number of times credentialed, and trust factor about the source who verified and relevance about the source and time when verified. Therefore, in such embodiments, a multi-scaled and cumulative score may be determined and multi-scaled and cumulative credentialing may be done based on the multi-scaled cumulative score determined.

The information pertaining to credentialing of the individual federated profiles of a particular common profile associated with a respondent 104a may influence an overall credentialing of the common profile. For example, individual credentialing of the federated segments may contribute to the overall common profile credentialing such that the credentialing of the overall common profile may depend on each of the federated profiles' credentialing with a weightage attached to each credentialing of the federated profiles. The collated contribution considering weightage effect of each credentialing finally decides credentialing of the overall common profile. The task of credentialing the overall common profile associated with a respondent 104a may be performed by the profile certification engine 514. For example, the profile certification engine 514 may facilitate credentialing of the profile in entirety based on the collated effect of credentialing of the federated profiles associated with the common profile of a respondent 104a. The profile certification engine 514 may receive information pertinent to credentialing of each of the federated profiles associated with a common profile and then associate the defined weightages to each of the federated profiles and perform cumulative credentialing of the common profile. In an embodiment, the weghtages may be determined based on parameters defined by a service provider who operates the system 312. In such embodiments, the weightages may be defined based on for example past experiences or current understanding about significance of accuracy of credentialing for different segments. For example, the accuracy of credentialing may be more important for work history than information pertinent to hobbies of a professional when applying for a job. Therefore, the objective use of the credentialing information may influence determination of the weightages and hence the overall credentialing. Therefore, a score indicative of the influence of the objective may be associated for the credentialing purposes in some embodiments. In some embodiments, the weightages may be defined by an agency requiring the credentialing information. Therefore, in such cases, the profile certification engine 514 may perform credentialing of the common profile in a custom defined manner and also in association with the objective score.

The profile certification server 504 further includes the segment rating engine 508. The segment rating engine 508 is configured to associate a rating to each of the credentialed federated profiles based on credentialing from the crowdsourced plurality of experts 402 and depending on a level of accuracy and trust associated with the credentialing of the federated profiles. The rating may depend on who credentialed a federated profile, when was a profile credentialed, how many times a profile was credentialed, how many unique credentials are done, relevance of experts credentialing the federated profile, relationship of the experts 402 with the respondent 104a of the credentialed federated profile, and the like.

The profile certification server 504 may further include the profile rating engine 510. The profile rating engine 510 is configured to associate a rating to an entire profile based on credentialing of each of the federated profiles and ratings associated with each of the federated profiles as determined by the segment rating engine 508 cumulatively.

The profile management server 502 is coupled to the profiles database 408 to store information pertinent to the profiles of the plurality of respondents 104. The profiles database 408 may be coupled to the federated profile manager 404 such that the federated profile manager 404 maintains the information stored in the profiles database 408.

The profile certification server 504 may be coupled to the profiles certification database 412. The profiles certification database 412 is configured to store information pertinent to credentialing such as certification status of the federated or common profiles associated with the plurality of respondents 104. For example, the certification status may include one or more of verified segment, verified profile, pending verification, verification in progress, segment rejected as incorrect, profile rejected as incorrect and the like. The profiles certification database 412 may be coupled to the profiles database 408 and the certification engine 410.

The profile certification server 504 may be coupled to a certified profiles database 516. The certified profiles database 516 may further be coupled to the profiles certification database 412. The certified profiles database 516 may be configured to store profiles that have been verified by the certification engine 410. An entity or any other agency may be allowed a direct access to the certified profiles database 516 based on preferences and rules defined for the entity or the agency. The entity may be one of a medical entity such as a hospital, nursing center, doctor, physician, healthcare unit, and government healthcare department, or a financial institute, or a logistic company, or a transportation company, or a company in the energy sector, or any other third party or agency. The certified profile or credential database 516 may further store information pertinent to one or more of work history, education, and personal demographics, affiliations to hospitals or other institutes etc of one or more experts.

The profiles database 408, profiles certification database 412, and certified profiles database 516 may be coupled to a profiles sources database 518. The profile sources database 518 may include information about a plurality of sources in the crowdsourced network 106 that are linked to the federated profiles associated with the plurality of the respondents 104, and information about a plurality of sources who responds to the federated profiles for credentialing. For example, in the crowdsourced network 106, the plurality of experts 402 may credential the federated profiles and thus the profiles sources database 518 may store their details, their names, other information, their relevance and relationship with the respondents 104 associated with the federated profiles they credential and time of credentialing, and location of original credentialing or any other such information pertinent to the credentialing sources etc.

Figure 6:
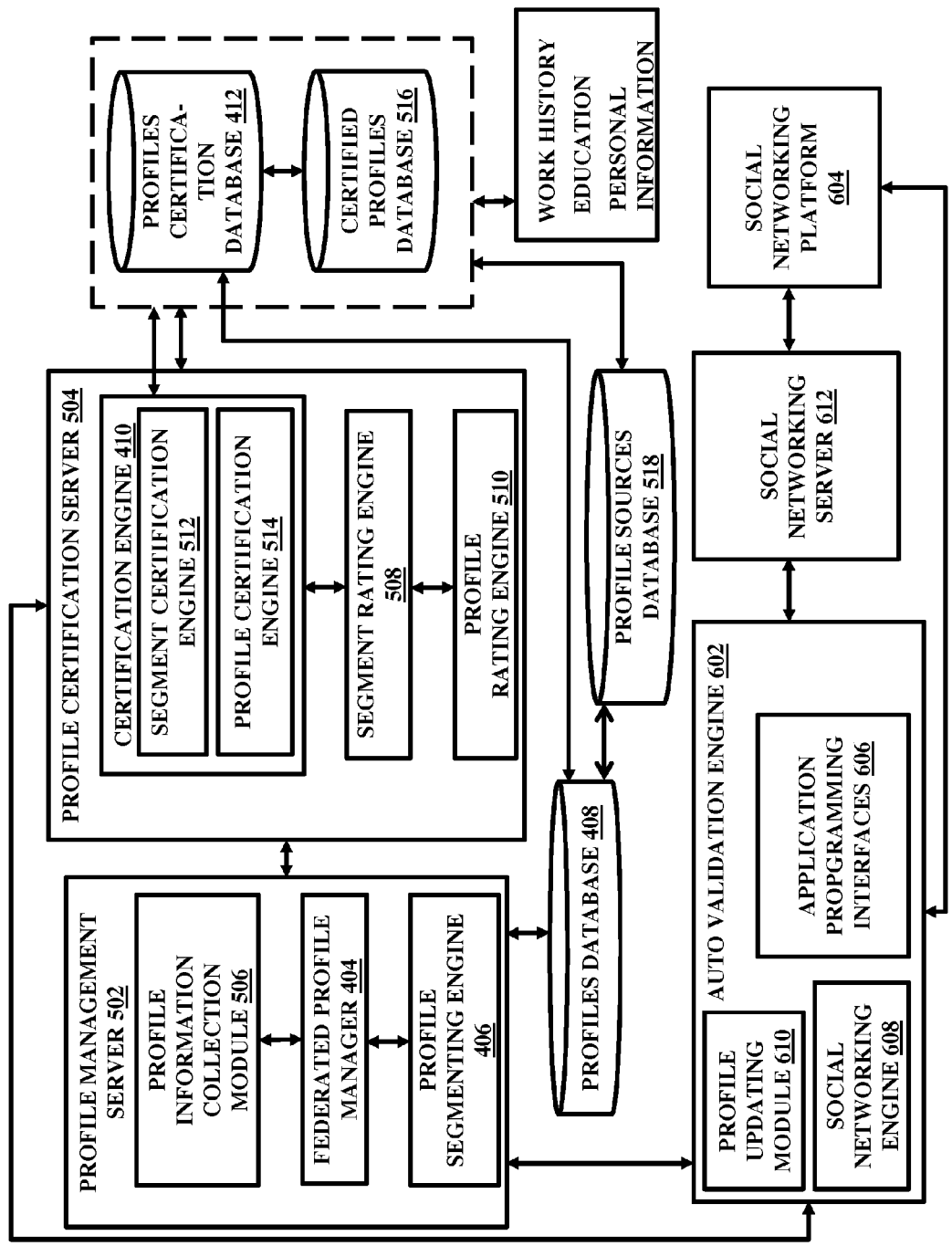
FIG. 6 illustrates a credentialing system in accordance with another embodiment herein.

FIG. 6, with reference to FIGS. 1 through 5, illustrates another embodiment of the credentialing system 312. The credentialing system 312 may include the profile management server 502 and the profile certification server 504 as discussed above. The system 312 may further include an auto-validation engine 602 coupled to the profile certification server 504 and the profile management server 502. The auto-validation engine 602 is further communicatively linked to a social networking platform 604. The social networking platform 604 hosts information related to one or more of the respondents 104. For example, the social networking platform 604 may host social profiles of the respondents 104 where the respondents 104 may store and update their personal, professional or other such details or may communicate in a social network with friends, relatives, family members, or other such networking contacts.

The auto-validation engine 602 is configured to further certify the credentialing of the federated profiles that is performed by the certification engine 312. The second level certification by the auto-validation engine 602 is performed by using the information about the one or more respondents 104 from the social networking platform 604. For example, a respondent 104a may be associated with a social networking website such as a Linkedin or Facebook. The respondent 104a may maintain a separate profile for each such social networking website. The credentialing of the respondent 104a for specific federated profiles may thus be further verified by using the information obtained from the social networking profiles.

In an embodiment, the credentialing by the experts 402 is used to associate a rating and define a level of trust for the federated profiles and the common profiles. The further verification based on the information obtained from the social profiles of the respondents 104 may further associate another rating or score to the federated profiles such that a level of trust about the plurality of respondents 104 and their federated and common profiles may be determined based on a cumulative effect of credentialing and the auto validation of the federated profiles and the common profiles. The cumulative score determined based on individual scores from the auto validation and the credentialing by the experts 402 may define a net rating and overall credentialing of the federated profiles and the common profiles. The federated profiles and the common profiles in association with the information pertinent to the credentialing and the auto-validation may thus be used or accessed by agencies or organizations or entities 102 to determine a level of trust in the credentialed information; i.e., the credentialed federated and thus common profiles.

The auto-validation engine 602 may include application programming interfaces (APIs) 606, a social networking engine 608, and a profile updating module 610.

The social networking engine 608 is coupled to one or more social networking server 612. The social network engine 608, which may be controlled by the social networking server 612, is configured to process a request of the credentialing system 312 for retrieving social profiles information and verifying the credentialed federated and common profiles by using the information obtained from the social profiles. The social networking engine 608 is communicatively coupled to the social networking platform 604 through the social network server 612 to allow interfacing of the system 312 with a social networking service. The social network server 612 may provide a programmatic web interface via the network for accessing the social profiles by the system 312. In some embodiments, the social networking server 612 may store social data related to the one or more respondents 104 obtained from the social profiles hosted by the social networking platform 604 to integrate the social data with the credentialed federated profiles for further verification or updating of the credentialing by auto-validation.

The social networking engine 608 may utilize the APIs 606 etc. to allow verification of the federated segments associated with the plurality of respondents 104 based on the information contained in the social profiles of each of the respondents 104 maintained by the social networking platform 604. In an embodiment, the social profiles maintained by the social networking platform 604 are distinct from the federated or common profiles of the respondents 104 maintained by the federated profile manager 404. The APIs 606 further allow the auto-validation to determine an extent of mapping between the information contained in the two distinct profiles maintained by the federated profile manager 404 and the social networking platform 604. The social networking platform 604 may include several social networking sources. The social networking sources may include without limitations social networking websites, educational institutions, employers' databases etc. For example, a respondent 104a may be associated with one or more of such or other similar social networking sources in the social networking platform 604. The APIs 606 are adapted to link each of the federated profiles to one or more such distinct sources of the social networking platform 604 such that a unique identifier is maintained that associate a distinct source of the social networking platform 604 to a federated profile.

The profile updating module 610 is configured to update or modify the profiles based on further verification of the federated profiles after auto-validation. For example even after the credentialing by the experts 402, the auto-validation may demand to modify the federated profiles which the profiles updating module 610 may do, in some cases after seeking permissions from the respondents 104. The profile updating module 610 may be communicatively coupled to the profile management server 502 so as the federated profile manager 404 to store and maintain the modified federated and common profiles.

The social networking platform 604 may include for example one or more social networking sources. The sources may be such as social networking websites, educational institutions, employers' databases or portals or platforms, hiring agencies' portals, and other such sources of creating a socially aware network. Some examples of social networking websites are without limitations Linkedin, MySpace, About Me, etc.

A service provider may deploy the credentialing system 312 and provide credentialing services to various organizations or agencies that can be a hiring agency, recruitment and selection or placement department or agency, document or inventions or ideas reviewing and scoring and evaluation agencies, an entity such as a hospital or a medical institute, financial institute, logistic company, transportation company etc. The organizations such as document or inventions or ideas reviewing and scoring and evaluation organizations can deploy these systems in-house for evaluation of ideas or documents. A respondent 104*a* may submit his profile details to the service provider that may be stored in the system 312. The service provider may obtain verifications and credentialing of the profile details or other information provided by the respondent 104*a* and may store the information pertinent to the credentialing of the information of the respondent 104*a*.

In an embodiment, the credentialed expertise for each of the respondents 104 allows classification of the respondents 104 into distinct groups, with each group tagged with a trust-relationship identifier indicative of a trust and reliability that each group guarantees based on respective credentialed expertise. The trust-relationship identifier is further associated with an information pertaining to a relevant domain expertise such that the trust and reliability indicated by the trust-relationship identifier is guaranteed only in association with the relevant domain expertise.

Figure 7:
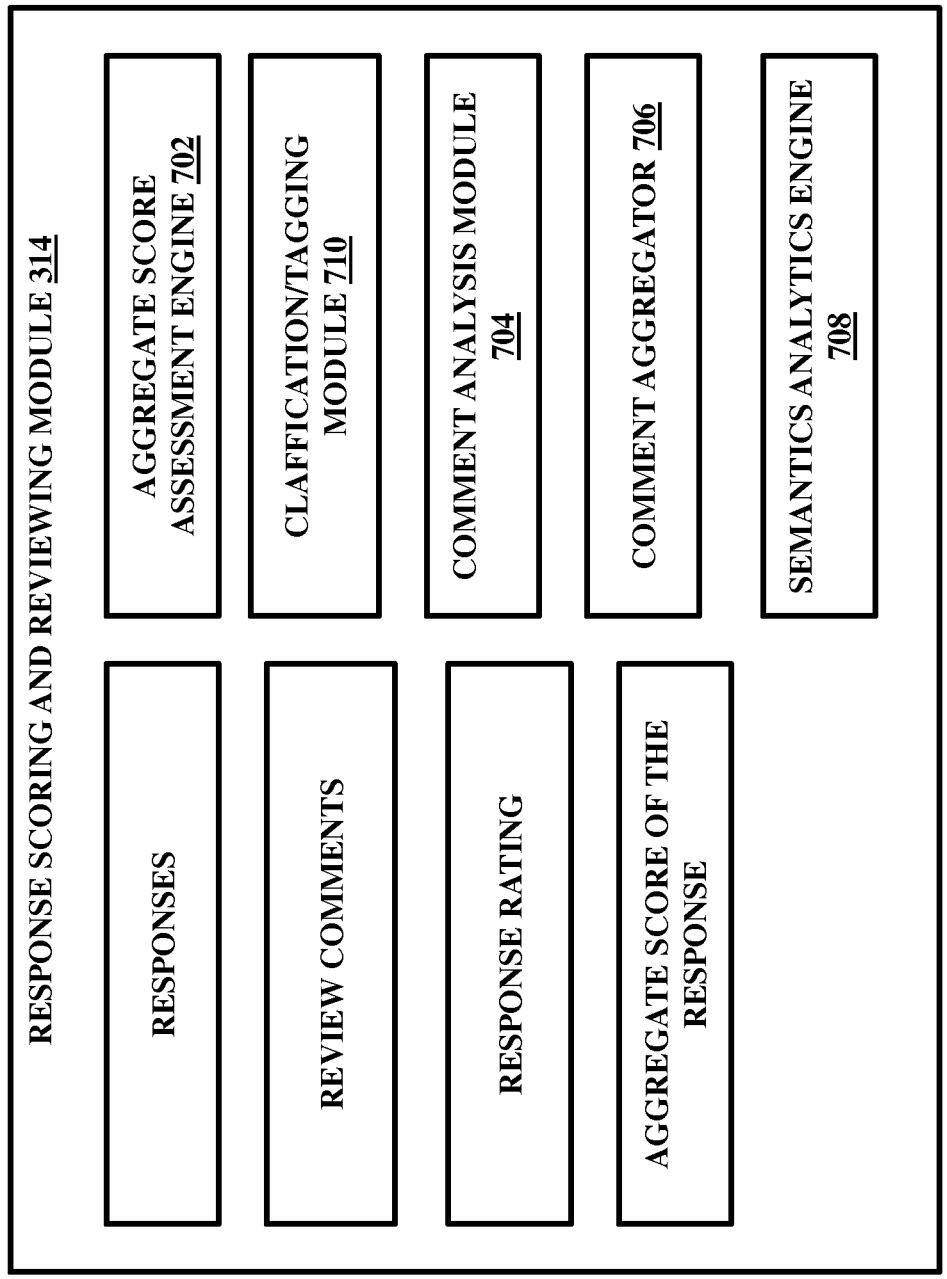
FIG. 7 illustrates a response scoring module in accordance with an exemplary embodiment herein.

FIG. 7, with reference to FIGS. 1 through 6, illustrates a response scoring module 314 in accordance with an exemplary embodiment herein. The response scoring module 314 receives review comments along with a response rating by each of the crowdsourced respondents 104 for a response corresponding to a federated case. In an example, a facility of the response reviewing and scoring may be provided only to those respondents 104 who possess a defined threshold of an aggregate credentialed expertise as minimum criteria, as determined in conjunction with FIGS. 1 through 6. The response scoring module 314 associates an aggregate score to the response based on aggregation of review ratings by the crowdsourced respondents 104 and aggregate scores of each of the crowdsourced respondents 104 based on a set of attributes including one or more of the credentialed expertise, a reputation of a respondent, and officiality of a respondent. In an embodiment, response scores by a plurality of crowdsourced respondents 104 may be calculated based on an affect of crowdsourcing index that may bear a non-linear relationship with the crowdsourcing score. The crowdsourcing index may be associated with the credentialing process or credentialed expertise and may be indicative of a degree of crowdsourcing such that the degree of crowdsourcing non-linearly affects the degree of credentialing that is indicative through the crowdsourcing index.

In some embodiments, the response scoring module 314 includes a response aggregate score assessment engine 702, comment analysis module 704, comment aggregator 706, semantics and analytics engine 708, and response classification/tagging module 710.

In some embodiments, the response aggregate score assessment engine 702 determines an aggregate score of the responses based on individual scores of the response from individual crowdsourced respondents 104 corresponding to a federated case. The response aggregate score assessment engine 702 may also utilize a non-linear crowdsourcing index for determining the aggregate score. The comment analysis module 704 may analyze review comments posted by the respondents 104 while reviewing the cases. The comments serve as a learning and knowledge repository in evaluating the cases in detail. The aggregate score of the response may thus be associated with a subjective comment section for use by second level reviewers etc. The comment analysis module 704 may be coupled to or may include the comment aggregator 706. The comment aggregator 706 may collate comments from various individual respondents 104. For example, the comment aggregator 706 may collate similar types of comments together. The comment aggregator 706 and comment analysis module 704 may be coupled to the semantics and analytics engine 708 that facilitates comments classification, collation, and analysis by implementing various semantics, analytics, and learning algorithms, functions, tools, programs and the like. The semantics engine 708 infers logical consequences from the review comments. The semantics engine 708 utilizes semantics and learning tools to determine intent and contextual meaning of terms as they appear in content of the review comments to generate more relevant results. The response classification/tagging module 710 may determine a relevant category or taxonomy class and accordingly tag the response for the classified category. The category may be decided based on for example defined classes, based on technology areas and sub areas, based on reviews, based on value of content and the like.

In an example, various empirical relations may be used to determine the aggregate response score based on individual attributes of the crowdsourced respondents, scores of the crowdsourced respondents, response scores by individual respondents, aggregation of the respondents' scores, aggregation of the attributes scores, aggregation of the response's individual scores, multi-level crowdsourcing index, and aggregation of multiple multi-level crowdsourcing indices.

Figure 8:
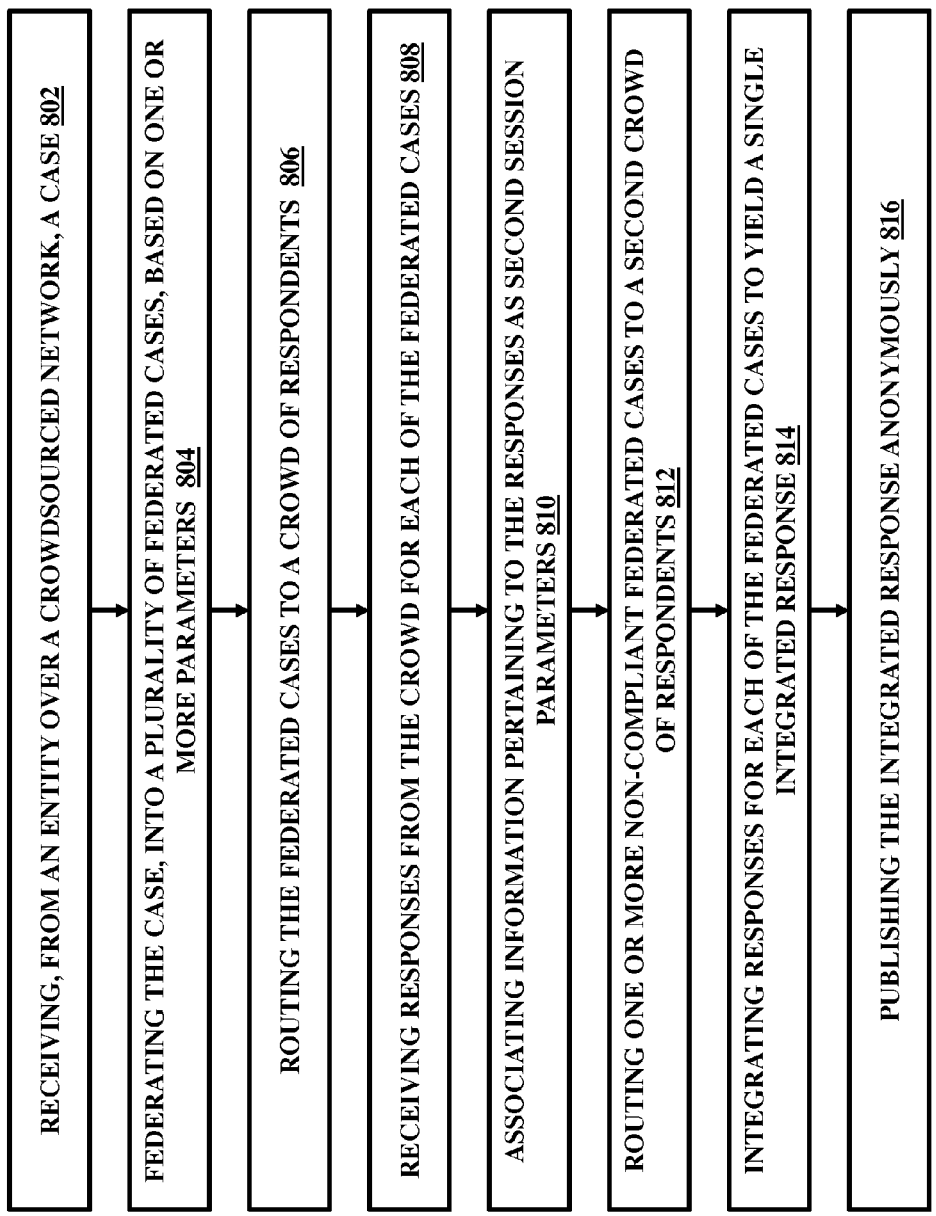
FIG. 8 illustrates a method flowchart for management of responses to cases submitted by a plurality of entities in a crowdsourced network in accordance with an embodiment herein.

FIG. 8, with reference to FIGS. 1 through 7, illustrates a method flowchart for management of responses to cases submitted by a plurality of entities 102 in the crowdsourced network 106. The method includes receiving, from an entity over the crowdsourced network, a medical case at step 802. At step 804, the method further includes federating the medical case, into a plurality of federated cases, based on one or more parameters including a level of complexity, technology involved, and a level of reliability and trust desired in its respective response. Each of the federated cases are associated with one or more corresponding first session parameters that are indicative of a respective level of complexity, technology involved, a level of reliability and trust in response desired. The method includes, at step 806, routing the federated medical cases to the crowd of respondents 104 in the network 106 such that the routing of the medical cases is managed based on the first session parameters associated with each of the federated medical parameters. The method includes receiving responses from the crowd for each of the federated medical cases at step 808. At step 810, the method includes associating information pertaining to the responses as second session parameters that is compared with the first session parameters such that the comparison yields a degree of compliance and appropriateness of the second session parameters toward the first session parameters. In response to a degree of compliance below a threshold for one or more federated medical cases, an adjusted set of third session parameters are associated with the one or more such federated medical cases. At step 812, the method includes routing the one or more such non-compliant federated medical cases to a second crowd of respondents 104 in the network 106 such that the routing of the medical cases is managed based on the third session parameters associated with each of the one or more federated medical parameters. At step 814, the method includes integrating responses for each of the federated medical cases to yield a single integrated response for the medical case corresponding to the federated medical cases. At step 816, the method then includes publishing the integrated response anonymously that is viewable publicly.

The method may further include defining a crowdsourcing index (CI) that is indicative of a crowd of respondents 104 such that the CI and the level of reliability and trust bear a non-linear relationship with one another, in some embodiments. In some embodiments, the CI is defined based on desired reliability and trust in the integrated response.

In some embodiments, the method may include comparing the first session parameters with the second session parameters, comparing the second session parameters with the third session parameters, and generating a correlationship map between each of the first session parameters and the second session parameters, and the second session parameters and the third session parameters. The correlationship map is indicative of the compliance.

In some embodiments, the method may include determining the adjusted third session parameters based on a comparison of the second session parameters with the first session parameters in view of the threshold level.

In some embodiments, the method may include assessing credentialed expertise of the respondents 104. The credentialed expertise is indicative of credibility of responses submitted by the respondents 104.

In some embodiments, the method may include evaluating complexity of various portions of the medical case prior to federating the case into the federated cases based on the level of complexity of the portions, wherein the complexity is evaluated based on inputs from a plurality of crowdsourced persons. In some embodiments, the complexity is identified by using a crowdsourcing index (CI) that is indicative of a crowd of persons such that the CI and the complexity bear a non-linear relationship with one another.

In some embodiments, the method may include reviewing the integrated response and associating a score to the integrated response by crowdsourced experts 402 such that the integrated response when published bears a rating indicative of the experts review and score. In some embodiments, the scoring and reviewing utilizes a crowdsourcing index (CI) that is indicative of a crowd of experts 402 involved in review and scoring such that the CI and a response rating based on review and scoring bear a non-linear relationship with one another.

Figure 9A:
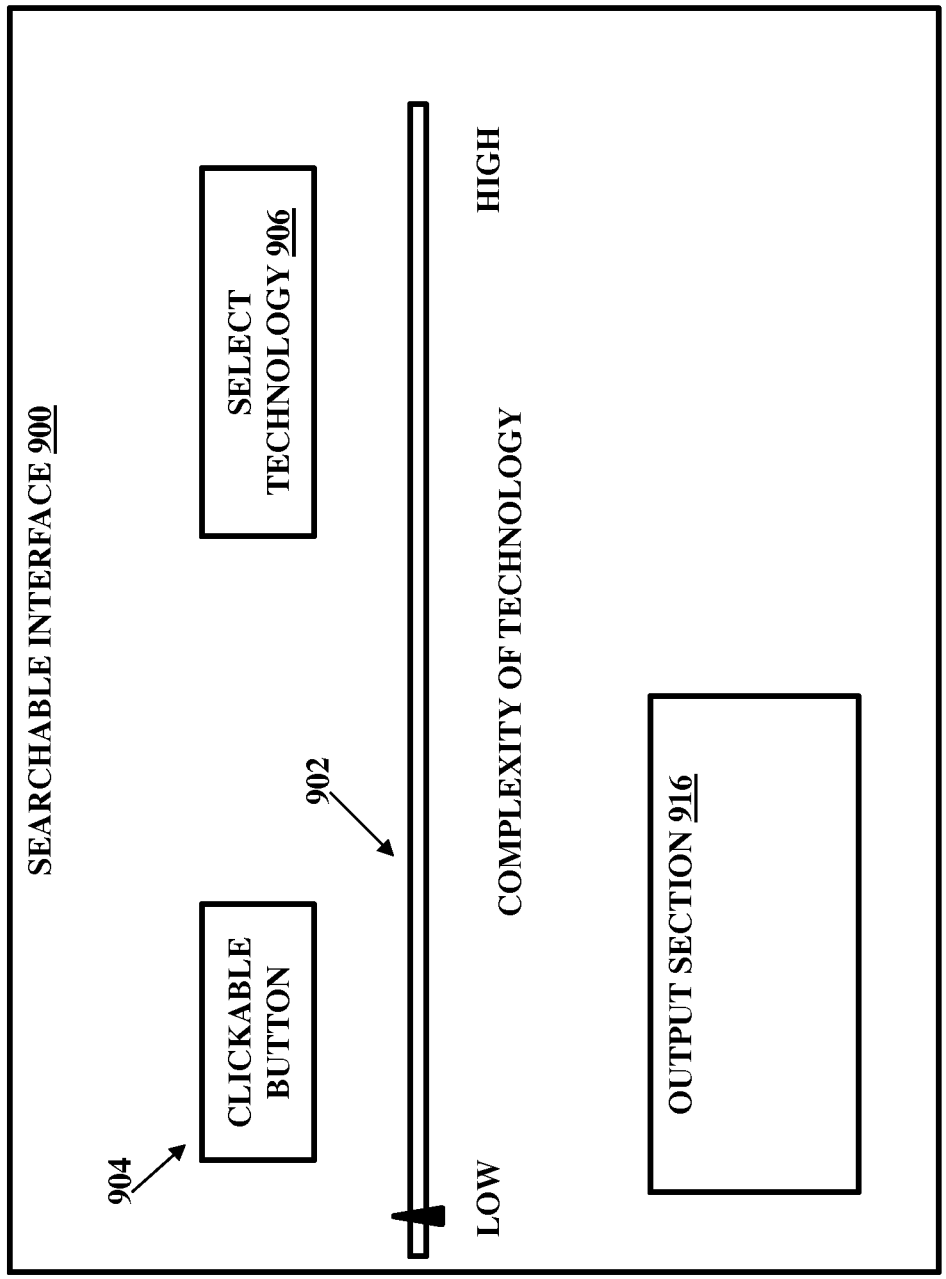
FIGS. 9A and 9B illustrate user searchable interfaces to access various cases and responses in accordance with an embodiment herein.

FIG. 9A, with reference to FIGS. 1 through 8, illustrates a searchable interface 900 for allowing a user to navigate through cases and respective responses that meet defined parameters. In an embodiment, as shown in FIG. 9A, the searchable interface 900 includes a bar 902 for a web platform that provides a unified way for defining one or more parameters in a multi-parameter based multi-functional manner. The multi-parameter based and multi-functional bar includes a button 904 disposed proximate the bar and operable by a defined number of mouse clicks to allow defining of a parameter. Various parameters are defined by distinct mouse click patterns. For example, clicking of the button 904 once allows the user to set a first parameter such as complexity of the case, clicking of the button twice allows the user to set credentialed expertise of respondents, and the like. Once the parameters are selected, the user can define the parameter by using the bar. The interface 900 also includes a tab 906 to define the technology of the search. The results of search are displayed in the output section 916.

Figure 9B:
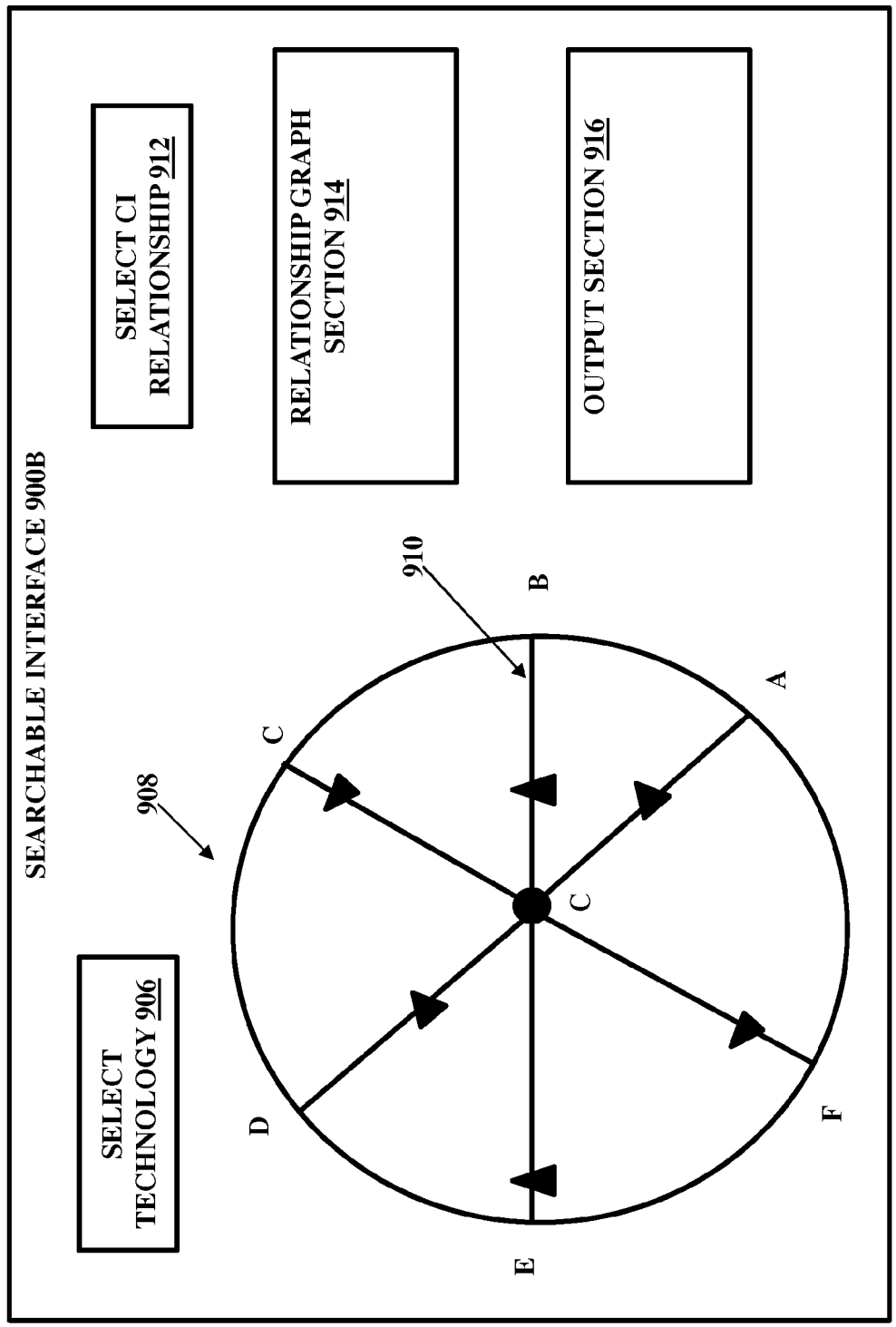

In another embodiment, as shown in FIG. 9B, with reference to FIGS. 1 through 9A, a searchable interface 900B includes a bar 908 for the web platform that provides a unified way for defining one or more parameters in a multi-parameter based multi-functional manner. The multi-parameter based and multi-functional bar 908 includes a plurality of axes 910, each axis extending from a center of origin C of the axes 910. The axes 910 are located around the center of the origin C of the axes 910 such that each axis also defines a bar 908 for a defined parameter. For example, as shown in FIG. 9B, the axis A indicates a bar for defining complexity of the technology, axis B indicates another bar for defining credentialed expertise, axis C indicates a third bar for defining crowdsourcing index, axis D indicates a bar for defining number of respondents, axis E indicates a bar for defining a lag between the first and the second session parameters indicative of appropriateness of the responses, axis F indicates a bar defining number of parameters considered in a particular session such as number of parameters in the first session or second session, and the like. A user can adjust the parameters desired in his search by using one or more bars 908 that define various parameters. Once the parameters are adjusted, the user can search for the responses defined through the multi-axis based bar 908. In an embodiment, circumference of a circle touching end points of the axes 910 defines highest value of the parameters and the center C of the circle defines minimum value of the parameters. In an embodiment, the axes 910 shows are exemplary and may include more axes to define more parameters. In an embodiment, the interface 900B may also include a tab 912 to select a crowdsourcing index (CI) non-linear relationship such as an exponential relationship and the like between two variables. The variables can be such as number of respondents 104 and trust associated with the responses. Based on selection of a particular relationship, the searchable interface 900B can present a visual graph 914 indicative of the nature of responses and the number of responses thus identified and also can indicate a comparative analysis of the responses using several other recommended relationships as desired. The interface 900B also includes a tab 906 to define the technology of the search. The results of search are displayed in the output section 916.

The embodiments herein may be embodied as a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities 102, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
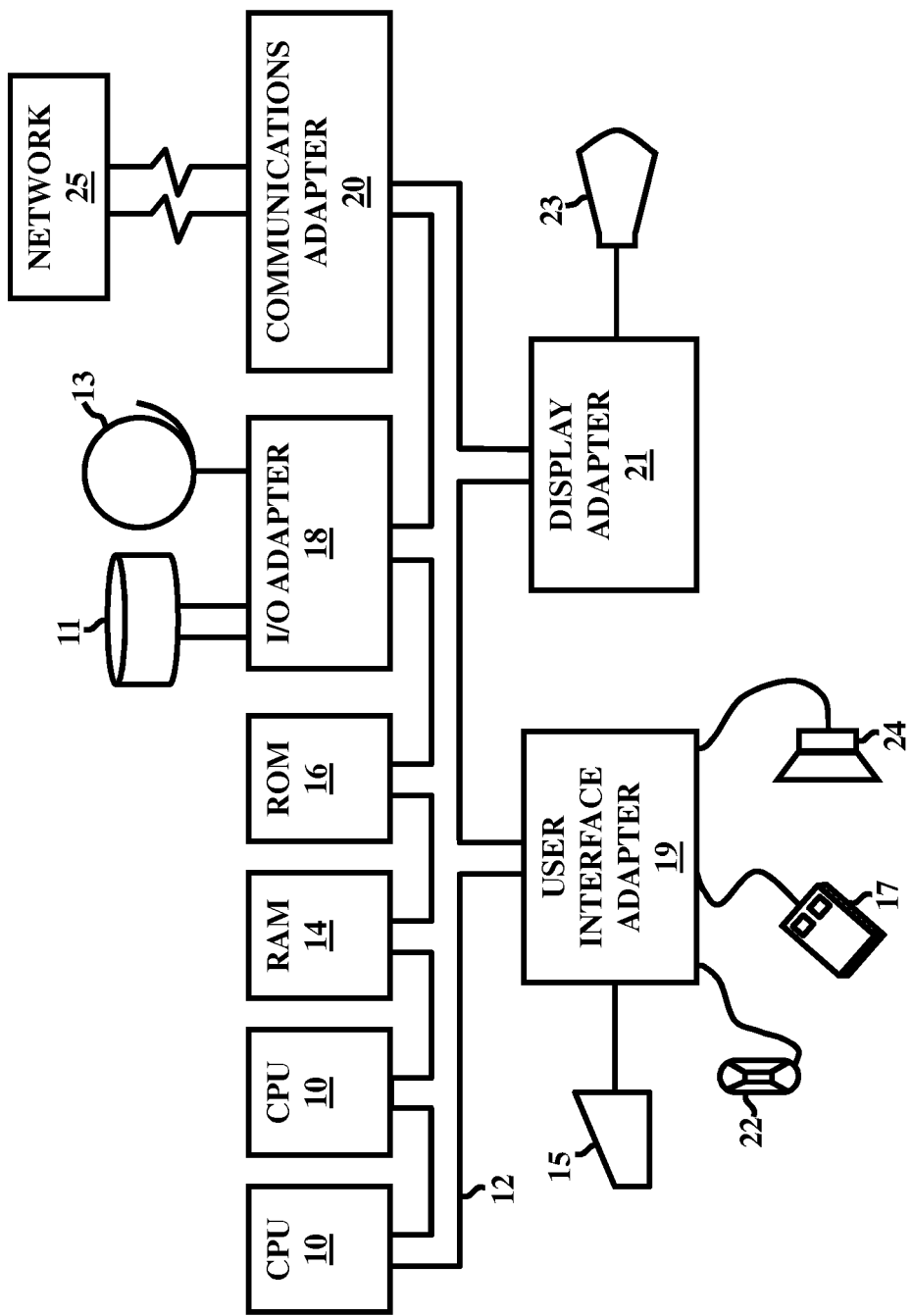
FIG. 10 illustrates generally, but not by the way of limitation, a computer system that may be used in accordance with the embodiments herein.

A representative hardware environment for practicing the embodiments herein is depicted in FIG. 10, with reference to FIGS. 1 through 9B. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A response management system configured to allow management of responses to a case submitted by an entity in a crowdsourced network, said system comprising:
   a memory for storing information pertaining to said case submitted by said entity, respective responses for said case by a crowd of respondents in said crowdsourced network, and programmed instructions;
   a processing circuit configured to:
      receive, from said entity over said crowdsourced network, said case;
      federate said case, into a plurality of federated cases, based on one or more parameters including a level of complexity, technology involved, and a level of reliability and trust desired in its respective response, wherein each of said federated cases are associated with one or more corresponding session parameters that are indicative of a respective level of complexity, technology involved, a level of reliability and trust in response desired, and wherein said level of reliability and trust is controlled by using a crowdsourcing index (CI) that is indicative of a crowd of respondents;
      route said federated cases to said crowd of respondents in said network such that said routing of said federated cases is managed based on said session parameters associated with each of said federated cases;
      receive responses from said crowd for each of said federated cases;
      associate information pertaining to said responses as second session parameters that is compared with said first session parameters such that said comparison yields a degree of compliance and appropriateness of said second session parameters toward said first session parameters, wherein, in response to a degree of compliance below a threshold for one or more federated cases, an adjusted set of third session parameters are associated with said one or more such federated cases;
      route said one or more such non-compliant federated cases to a second crowd of respondents in said network such that said routing of said cases is managed based on said third session parameters associated with each of said one or more federated cases;
      integrate responses for each of said federated cases to yield a single integrated response for said case; and
      publish said integrated response anonymously that is viewable publicly,
      wherein said processing circuit further comprises a complexity evaluation engine to evaluate a complexity of various portions of said case prior to federating said case into said federated cases based on said level of complexity of said portions, and
      wherein said complexity evaluation engine evaluates a complexity of said various portions of said case based on inputs from a plurality of crowdsourced persons; and
   a scoring and reviewing module to review and associate a score to said integrated response by crowdsourced experts such that said integrated response when published bears a rating indicative of said experts review and score.

2. The system of claim 1, wherein said processing circuit comprises a federation engine that federates said case into said plurality of federated cases based on said one or more parameters including said level of complexity, technology involved, and said level of reliability and trust.

3. The system of claim 1, wherein said processing circuit further comprises a session parameters mapping engine that is configured to:
   compare said first session parameters with said second session parameters;
   compare said second session parameters with said third session parameters; and
   generate a correlationship map between each of said first session parameters and said second session parameters, and said second session parameters and said third session parameters, wherein said correlationship map is indicative of said compliance.

4. The system of claim 1, wherein said processing circuit further comprises a session parameter adjustment engine to determine said adjusted third session parameters based on a comparison of said second session parameters with said first session parameters in view of said threshold level.

5. The system of claim 1, wherein said processing circuit further comprises an integration engine to integrate said responses for said federated cases corresponding to said case.

6. The system of claim 1, wherein said processing circuit further comprises a credentialing engine to assess credentialed expertise of said respondents, wherein said credentialed expertise in indicative of credibility of responses submitted by said respondents.

7. The system of claim 6, wherein said credentialed expertise for each of said respondents allows classification of said respondents into distinct groups, with each group tagged with a trust-relationship identifier indicative of a trust and reliability that each group guarantees based on respective credentialed expertise.

8. The system of claim 7, wherein said trust-relationship identifier is further associated with an information pertaining to a relevant domain expertise such that said trust and reliability indicated by said trust-relationship identifier is guaranteed only in association with said relevant domain expertise.

9. A method for management of responses to cases submitted by an entity in a crowdsourced network, said method comprising:
   receiving, from said entity over said crowdsourced network, a case;
   evaluating a complexity of various portions of said case based on said level of complexity of said portions;
   evaluating a complexity of said various portions of said case based on inputs from a plurality of crowdsourced persons;
   federating said case, into a plurality of federated cases, based on one or more parameters including a level of complexity, technology involved, and a level of reliability and trust desired in its respective response, wherein each of said federated cases are associated with one or more corresponding session parameters that are indicative of a respective level of complexity, technology involved, a level of reliability and trust in response desired;
   defining a crowdsourcing index (CI) that is indicative of a crowd of respondents, wherein said CI is defined based on desired reliability and trust in said integrated response;
   routing said federated cases to said crowd of respondents in said network such that said routing of said cases is managed based on said session parameters associated with each of said federated cases;

receiving responses from said crowd for each of said federated cases;

associating information pertaining to said responses as second session parameters that is compared with said first session parameters such that said comparison yields a degree of compliance and appropriateness of said second session parameters toward said first session parameters, wherein, in response to a degree of compliance below a threshold for one or more federated cases, an adjusted set of third session parameters are associated with said one or more such federated cases;

routing said one or more such non-compliant federated cases to a second crowd of respondents in said network such that said routing of said cases is managed based on said third session parameters associated with each of said one or more federated cases;

integrating responses for each of said federated cases to yield a single integrated response for said case corresponding to said federated cases;

reviewing said single integrated response and associating a score to said single integrated response by crowdsourced experts such that said single integrated response when published bears a rating indicative of said experts review and score; and publishing said integrated response anonymously that is viewable publicly.

10. The method of claim 9, further comprising:

comparing said first session parameters with said second session parameters;

comparing said second session parameters with said third session parameters; and generating a correlationship map between each of said first session parameters and said second session parameters, and said second session parameters and said third session parameters, wherein said correlationship map is indicative of said compliance.

11. The method of claim 9, further comprising determining said adjusted third session parameters based on a comparison of said second session parameters with said first session parameters in view of said threshold level.

12. The method of claim 9, further comprising assessing credentialed expertise of said respondents, wherein said credentialed expertise is indicative of credibility of responses submitted by said respondents.

13. The method of claim 9, wherein said scoring and reviewing utilizes a crowdsourcing index (CI) that is indicative of a crowd of experts involved in review and scoring such that said CI and a response rating based on review and scoring bear a non-linear relationship with one another.

14. A non-transitory program storage device readable by a computer, and comprising a program of instructions executable by said computer to perform a method for management of responses to cases submitted by an entity in a crowdsourced network, said method comprising:

receiving, from said entity over said crowdsourced network, a case;

evaluating a complexity of various portions of said case based on said level of complexity of said portions;

evaluating a complexity of said various portions of said case based on inputs from a plurality of crowdsourced persons;

federating said case, into a plurality of federated cases, based on one or more parameters including a level of complexity, technology involved, and a level of reliability and trust desired in its respective response, wherein each of said federated cases are associated with one or more corresponding session parameters that are indicative of a respective level of complexity, technology involved, a level of reliability and trust in response desired;

defining a crowdsourcing index (CI) that is indicative of a crowd of respondents, wherein said CI is defined based on desired reliability and trust in said integrated response;

routing said federated cases to said crowd of respondents in said network such that said routing of said cases is managed based on said session parameters associated with each of said federated cases;

receiving responses from said crowd for each of said federated cases;

associating information pertaining to said responses as second session parameters that is compared with said first session parameters such that said comparison yields a degree of compliance and appropriateness of said second session parameters toward said first session parameters, wherein, in response to a degree of compliance below a threshold for one or more federated cases, an adjusted set of third session parameters are associated with said one or more such federated cases;

routing said one or more such non-compliant federated cases to a second crowd of respondents in said network such that said routing of said cases is managed based on said third session parameters associated with each of said one or more federated cases;

integrating responses for each of said federated cases to yield a single integrated response for said case corresponding to said federated cases;

reviewing said single integrated response and associating a score to said single integrated response by crowdsourced experts such that said single integrated response when published bears a rating indicative of said experts review and score; and publishing said integrated response anonymously that is viewable publicly.

\* \* \* \* \*